United States Patent
Balteanu et al.

(10) Patent No.: US 10,826,570 B2
(45) Date of Patent: Nov. 3, 2020

(54) APPARATUS AND METHODS FOR MULTI-ANTENNA COMMUNICATIONS

(71) Applicant: Skyworks Solutions, Inc., Irvine, CA (US)

(72) Inventors: Florinel G. Balteanu, Irvine, CA (US); Paul T. DiCarlo, Marlborough, MA (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

(21) Appl. No.: 16/423,699

(22) Filed: May 28, 2019

(65) Prior Publication Data

US 2019/0372628 A1    Dec. 5, 2019

Related U.S. Application Data

(60) Provisional application No. 62/678,463, filed on May 31, 2018, provisional application No. 62/687,973, filed on Jun. 21, 2018.

(51) Int. Cl.
*H04B 7/04* (2017.01)
*H04B 7/0413* (2017.01)
(Continued)

(52) U.S. Cl.
CPC ......... *H04B 7/0413* (2013.01); *H04B 7/0404* (2013.01); *H04L 25/06* (2013.01)

(58) Field of Classification Search
CPC .. H04B 7/0413; H04B 7/0404; H04B 7/0848; H04B 7/0871; H04L 25/06
See application file for complete search history.

(56) References Cited

U.S. PATENT DOCUMENTS

| | | | | |
|---|---|---|---|---|
| 4,079,318 A | * | 3/1978 | Kinoshita | H04B 7/084 455/139 |
| 6,049,724 A | | 4/2000 | Rozenblit et al. | |

(Continued)

FOREIGN PATENT DOCUMENTS

WO    WO 2017/161347 A1    9/2017

OTHER PUBLICATIONS

International Search Report and Written Opinion for International Application No. PCT/US2019/034190 dated Sep. 19, 2019 in 22 pages.

*Primary Examiner* — Jean B Corrielus
(74) *Attorney, Agent, or Firm* — Knobbe, Martens, Olson & Bear, LLP

(57) ABSTRACT

Apparatus and methods for multi-antenna communications are provided. In certain embodiments, a communication system includes an antenna array including a plurality of antenna elements, and a plurality of RF circuit channels each coupled to a corresponding one of the antenna elements. The plurality of RF circuit channels generate two or more analog baseband signals in response to the antenna array receiving a radio wave. The communication system further includes a controllable amplification and combining circuit that generates two or more amplified analog baseband signals based on amplifying each of the two or more analog baseband signals with a separately controllable gain, and that combines the two or more amplified analog baseband signals to generate a combined analog baseband signal.

20 Claims, 16 Drawing Sheets

(51) Int. Cl.
*H04B 7/0404* (2017.01)
*H04L 25/06* (2006.01)

(56) References Cited

U.S. PATENT DOCUMENTS

| | | | |
|---|---|---|---|
| 6,249,190 B1 | 6/2001 | Rozenblit et al. |
| 6,438,365 B1 | 8/2002 | Balteanu |
| 6,466,069 B1 | 10/2002 | Rozenblit et al. |
| 6,466,772 B1 | 10/2002 | Rozenblit et al. |
| 6,529,712 B1 | 3/2003 | Domino et al. |
| 6,545,554 B1 | 4/2003 | Rozenblit et al. |
| 6,614,837 B1 | 9/2003 | Abdelgany et al. |
| 6,633,751 B1 | 10/2003 | Damgaard et al. |
| 6,650,875 B1 | 11/2003 | Rozenblit et al. |
| 6,658,237 B1 | 12/2003 | Rozenblit et al. |
| 6,670,849 B1 | 12/2003 | Damgaard et al. |
| 6,671,500 B2 | 12/2003 | Damgaard et al. |
| 6,697,613 B1 | 2/2004 | Domino et al. |
| 6,704,560 B1 | 3/2004 | Balteanu et al. |
| 6,792,282 B1 | 9/2004 | Domino et al. |
| 6,795,712 B1 | 9/2004 | Vakilian et al. |
| 6,801,784 B1 | 10/2004 | Rozenblit et al. |
| 6,950,636 B2 | 9/2005 | Rozenblit et al. |
| 6,961,547 B2 | 11/2005 | Rozenblit et al. |
| 6,977,976 B1 | 12/2005 | Birkett et al. |
| 7,082,169 B2 | 7/2006 | Rozenblit et al. |
| 7,099,636 B2 | 8/2006 | Rozenblit et al. |
| 7,103,127 B2 | 9/2006 | Damgaard et al. |
| 7,218,951 B2 | 5/2007 | Rozenblit et al. |
| 7,277,678 B2 | 10/2007 | Rozenblit et al. |
| 7,369,871 B2 | 5/2008 | Vakilian et al. |
| 7,376,116 B2 | 5/2008 | Rozenblit et al. |
| 7,400,862 B2 | 7/2008 | Domino et al. |
| 7,480,349 B2 | 1/2009 | Beamish et al. |
| 7,493,093 B2 | 2/2009 | Boerman et al. |
| 7,496,339 B2 | 2/2009 | Balteanu et al. |
| 7,512,392 B2 | 3/2009 | Millard et al. |
| 7,526,265 B2 | 4/2009 | Beamish et al. |
| 7,548,737 B2 | 6/2009 | Domino et al. |
| 7,593,484 B2 | 9/2009 | Beamish et al. |
| 7,647,028 B2 | 1/2010 | Beamish et al. |
| 8,140,028 B2 | 3/2012 | Balteanu et al. |
| 8,351,873 B2 | 1/2013 | Balteanu et al. |
| 8,385,853 B2 | 2/2013 | Prikhodko et al. |
| 8,717,101 B2 | 5/2014 | Li et al. |
| 8,718,188 B2 | 5/2014 | Balteanu et al. |
| 8,786,371 B2 | 7/2014 | Popplewell et al. |
| 8,823,459 B2 | 9/2014 | Obkircher et al. |
| 8,981,847 B2 | 3/2015 | Balteanu |
| 9,071,325 B2 | 6/2015 | Pullela et al. |
| 9,083,455 B2 | 7/2015 | Popplewell et al. |
| 9,092,393 B2 | 7/2015 | Whitefield et al. |
| 9,118,277 B2 | 8/2015 | Balteanu |
| 9,136,803 B2 | 9/2015 | Li et al. |
| 9,143,096 B2 | 9/2015 | Balteanu et al. |
| 9,189,430 B2 | 11/2015 | Ross et al. |
| 9,197,128 B2 | 11/2015 | Popplewell et al. |
| 9,294,054 B2 | 3/2016 | Balteanu et al. |
| 9,337,356 B2 | 5/2016 | Smith et al. |
| 9,391,648 B2 | 7/2016 | Popplewell et al. |
| 9,425,833 B2 | 8/2016 | Popplewell et al. |
| 9,445,371 B2 | 9/2016 | Khesbak et al. |
| 9,450,570 B2 | 9/2016 | Obkircher et al. |
| 9,473,194 B2 | 10/2016 | Domino |
| 9,553,619 B2 | 1/2017 | Domino |
| 9,584,070 B2 | 2/2017 | Balteanu et al. |
| 9,588,529 B2 | 3/2017 | Balteanu et al. |
| 9,606,947 B2 | 3/2017 | Ross et al. |
| 9,621,129 B2 | 4/2017 | Domino et al. |
| 9,647,746 B1 * | 5/2017 | Iwase ............ H04B 17/101 |
| 9,667,203 B2 | 5/2017 | Li et al. |
| 9,667,293 B2 | 5/2017 | Pullela et al. |
| 9,668,215 B2 | 5/2017 | Balteanu et al. |
| 9,673,707 B2 | 6/2017 | Popplewell et al. |
| 9,698,832 B2 | 7/2017 | Popplewell et al. |
| 9,735,117 B2 | 8/2017 | Smith et al. |
| 9,774,300 B2 | 9/2017 | Jin et al. |
| 9,806,676 B2 | 10/2017 | Balteanu et al. |
| 9,806,787 B2 | 10/2017 | Wloczysiak et al. |
| 9,813,029 B2 | 11/2017 | Zhu et al. |
| 9,813,137 B2 | 11/2017 | Wloczysiak et al. |
| 9,825,660 B2 | 11/2017 | Wloczysiak et al. |
| 9,831,834 B2 | 11/2017 | Balteanu et al. |
| 9,876,473 B2 | 1/2018 | Khesbak et al. |
| 9,893,682 B2 | 2/2018 | Zhu et al. |
| 9,893,752 B2 | 2/2018 | Domino et al. |
| 9,917,563 B2 | 3/2018 | Li et al. |
| 9,935,582 B2 | 4/2018 | Balteanu et al. |
| 9,948,241 B2 | 4/2018 | Popplewell et al. |
| 9,971,377 B2 | 5/2018 | Balteanu et al. |
| 9,973,088 B2 | 5/2018 | Balteanu et al. |
| 9,973,148 B2 | 5/2018 | Zhu et al. |
| 9,990,322 B2 | 6/2018 | Whitefield et al. |
| 9,991,856 B2 | 6/2018 | Khesbak et al. |
| 10,020,269 B2 | 7/2018 | Smith et al. |
| 10,056,925 B2 | 8/2018 | Domino |
| 10,063,216 B2 | 8/2018 | Domino |
| 10,080,192 B2 | 9/2018 | Balteanu et al. |
| 10,103,693 B2 | 10/2018 | Zhu et al. |
| 10,110,169 B2 | 10/2018 | Khesbak et al. |
| 10,125,011 B2 | 11/2018 | Mason et al. |
| 10,145,878 B2 | 12/2018 | Brunel et al. |
| 10,164,582 B2 | 12/2018 | Zhu et al. |
| 10,170,989 B2 | 1/2019 | Balteanu et al. |
| 10,181,820 B2 | 1/2019 | Balteanu et al. |
| 10,200,077 B2 | 2/2019 | Liu et al. |
| 10,205,426 B2 | 2/2019 | Zhu et al. |
| 10,218,390 B2 | 2/2019 | Wloczysiak et al. |
| 10,230,351 B2 | 3/2019 | Obkircher et al. |
| 10,236,966 B2 | 3/2019 | Brunel et al. |
| 10,256,921 B2 | 4/2019 | Bergsma et al. |
| 10,270,394 B2 | 4/2019 | Drogi et al. |
| 10,277,177 B2 | 4/2019 | Khesbak et al. |
| 10,333,470 B2 | 6/2019 | Balteanu et al. |
| 10,361,697 B2 | 7/2019 | Zhu et al. |
| 10,374,578 B2 | 8/2019 | Domino et al. |
| 10,381,983 B2 | 8/2019 | Balteanu et al. |
| 10,381,985 B2 | 8/2019 | Zhu et al. |
| 10,389,350 B2 | 8/2019 | Wang et al. |
| 10,396,737 B2 | 8/2019 | Domino et al. |
| 10,402,356 B2 | 9/2019 | Ross et al. |
| 10,404,166 B2 | 9/2019 | Khesbak et al. |
| 10,404,217 B2 | 9/2019 | Popplewell et al. |
| 10,404,302 B2 | 9/2019 | Pullela et al. |
| 10,410,957 B2 | 9/2019 | Wang et al. |
| 2002/0022493 A1* | 2/2002 | Elliot ............ H03G 3/3078<br>455/506 |
| 2002/0097081 A1* | 7/2002 | Razavi ............ H03D 3/008<br>327/307 |
| 2006/0073802 A1* | 4/2006 | Chari ............ H04B 7/084<br>455/276.1 |
| 2007/0129025 A1 | 6/2007 | Vasa et al. |
| 2007/0243832 A1* | 10/2007 | Park ............ H04B 1/006<br>455/73 |
| 2008/0084951 A1* | 4/2008 | Chen ............ H04B 7/04<br>375/347 |
| 2008/0096510 A1* | 4/2008 | Iizuka ............ H04B 7/0817<br>455/277.2 |
| 2009/0040107 A1* | 2/2009 | Yun ............ H01Q 3/2605<br>342/375 |
| 2009/0054025 A1* | 2/2009 | Iizuka ............ H03G 3/3078<br>455/230 |
| 2009/0295636 A1* | 12/2009 | Taniguchi ............ H04B 7/0894<br>342/378 |
| 2010/0067622 A1 | 3/2010 | Komaili et al. |
| 2010/0075611 A1* | 3/2010 | Budampati ............ H04B 7/0885<br>455/67.11 |
| 2010/0265875 A1* | 10/2010 | Zhao ............ H04B 1/0007<br>370/316 |
| 2011/0116404 A1* | 5/2011 | Shimizu ............ H04B 1/525<br>370/252 |
| 2012/0076229 A1* | 3/2012 | Brobston ............ H04W 52/0206<br>375/295 |

(56) References Cited

U.S. PATENT DOCUMENTS

| | | | |
|---|---|---|---|
| 2013/0337757 A1* | 12/2013 | Szortyka | H04B 1/18 455/233.1 |
| 2014/0065979 A1* | 3/2014 | Terry | H04B 1/30 455/73 |
| 2014/0079098 A1* | 3/2014 | Harjani | H04B 1/001 375/219 |
| 2014/0198689 A1* | 7/2014 | Loh | H04L 27/2601 370/280 |
| 2014/0266906 A1* | 9/2014 | Murai | H04B 7/0851 342/385 |
| 2015/0280804 A1* | 10/2015 | Melzer | H04B 7/0854 375/316 |
| 2015/0303974 A1 | 10/2015 | Domino | |
| 2015/0341196 A1 | 11/2015 | Sorrells et al. | |
| 2016/0009548 A1 | 1/2016 | Mason et al. | |
| 2017/0005624 A1 | 1/2017 | Zhu et al. | |
| 2017/0005626 A1 | 1/2017 | Zhu et al. | |
| 2017/0201310 A1 | 7/2017 | Nardozza | |
| 2017/0279436 A1 | 9/2017 | Domino et al. | |
| 2017/0287836 A1 | 10/2017 | Wang et al. | |
| 2018/0041204 A1 | 2/2018 | Zhu et al. | |
| 2018/0083689 A1 | 3/2018 | Oshima et al. | |
| 2018/0091132 A1 | 3/2018 | Wang et al. | |
| 2018/0091133 A1 | 3/2018 | Wang et al. | |
| 2018/0091134 A1 | 3/2018 | Wang et al. | |
| 2018/0091135 A1 | 3/2018 | Wang et al. | |
| 2018/0091136 A1 | 3/2018 | Wang et al. | |
| 2018/0138877 A1 | 5/2018 | Bergsma et al. | |
| 2018/0152945 A1 | 5/2018 | Balteanu | |
| 2018/0159476 A1 | 6/2018 | Balteanu et al. | |
| 2018/0159478 A1 | 6/2018 | Balteanu et al. | |
| 2018/0233578 A1 | 8/2018 | Shi et al. | |
| 2018/0234095 A1 | 8/2018 | Balteanu et al. | |
| 2018/0241424 A1 | 8/2018 | Domino et al. | |
| 2018/0278214 A1 | 9/2018 | Jin et al. | |
| 2018/0302054 A1 | 10/2018 | Li et al. | |
| 2018/0308810 A1 | 10/2018 | Smith et al. | |
| 2018/0331657 A1 | 11/2018 | Zhu et al. | |
| 2018/0337670 A1 | 11/2018 | Zhu et al. | |
| 2018/0351594 A1 | 12/2018 | Wloczysiak et al. | |
| 2018/0375476 A1 | 12/2018 | Balteanu et al. | |
| 2018/0375483 A1 | 12/2018 | Balteanu et al. | |
| 2019/0020315 A1 | 1/2019 | Khesbak et al. | |
| 2019/0028064 A1 | 1/2019 | Lee et al. | |
| 2019/0028078 A1 | 1/2019 | Lee et al. | |
| 2019/0068169 A1 | 2/2019 | Domino | |
| 2019/0123690 A1 | 4/2019 | Balteanu et al. | |
| 2019/0144266 A1 | 5/2019 | Mason et al. | |
| 2019/0178927 A1 | 6/2019 | Brunel et al. | |
| 2019/0181906 A1 | 6/2019 | Liu et al. | |
| 2019/0190461 A1 | 6/2019 | Zhu et al. | |
| 2019/0190462 A1 | 6/2019 | Zhu et al. | |
| 2019/0190623 A1 | 6/2019 | Bergsma et al. | |
| 2019/0229621 A1 | 7/2019 | Balteanu et al. | |
| 2019/0253087 A1 | 8/2019 | Domino | |
| 2019/0268027 A1 | 8/2019 | Wloczysiak et al. | |

\* cited by examiner

APPARATUS AND METHODS FOR MULTI-ANTENNA COMMUNICATIONS

CROSS-REFERENCE TO RELATED APPLICATIONS

This application claims the benefit of priority under 35 U.S.C. § 119 of U.S. Provisional Patent Application No. 62/687,973, filed Jun. 21, 2018 and titled "APPARATUS AND METHODS FOR MULTI-ANTENNA COMMUNICATIONS," and of U.S. Provisional Patent Application No. 62/678,463, filed May 31, 2018 and titled "APPARATUS AND METHODS FOR MULTI-ANTENNA COMMUNICATIONS," each of which is herein incorporated by reference in its entirety.

BACKGROUND

Technical Field

Embodiments of the invention relate to electronic systems, and in particular, to radio frequency (RF) electronics.

Description of Related Technology

A communication system can include a transceiver, a front end, and one or more antennas for wirelessly transmitting and/or receiving signals. The front end can include low noise amplifier(s) for amplifying relatively weak signals received via the antenna(s), and power amplifier(s) for boosting signals for transmission via the antenna(s).

Examples of communication systems include, but are not limited to, mobile phones, tablets, base stations, network access points, customer-premises equipment (CPE), laptops, and wearable electronics.

SUMMARY

In certain embodiments, the present disclosure relates to a radio frequency system. The radio frequency system includes two or more frequency downconverters configured to output two or more analog baseband signals in response to receiving a plurality of radio frequency signals from an antenna array. The radio frequency system further includes a controllable amplification and combining circuit configured to generate two or more amplified analog baseband signals based on amplifying each of the two or more analog baseband signals with a separately controllable gain, and to combine the two or more amplified analog baseband signals to generate a combined analog baseband signal. The radio frequency system further includes a data conversion and signal processing circuit configured to receive the combined signal.

In some embodiments, the controllable amplification and combining circuit is configured to generate the combined analog baseband signal in a first mode, and to output the two or more amplified analog baseband signals in a second mode. According to a number of embodiments, the radio frequency system operates with beamforming in the first mode and with diversity communications in the second mode.

In several embodiments, the controllable amplification and combining circuit includes two or more controllable gain input amplifiers configured to amplify the two or more analog baseband signals to generate the two or more amplified analog baseband signals. In accordance with various embodiments, the controllable amplification and combining circuit further includes two or more DC offset compensation circuits each configured to provide a separately controllable DC offset correction to a corresponding one of the two or more controllable gain input amplifiers.

In some embodiments, the data conversion and signal processing circuit includes two or more analog-to-digital converters each configured to receive a corresponding one of the two or more amplified analog baseband signals.

In various embodiments, the radio frequency system further includes two or more local oscillators configured to control downconversion of the two or more frequency downconverters. According to a number of embodiments, the two or more local oscillators each include a phase-locked-loop configured to receive a common timing reference signal.

In certain embodiments, the present disclosure relates to a method of radio frequency communication. The method includes receiving a radio wave using a plurality of antenna elements of an antenna array, generating two or more analog baseband signals using a plurality of radio frequency circuit channels each coupled to a corresponding one of the plurality of antenna elements, amplifying each of the two or more analog baseband signals with a separately controllable gain using a controllable amplification and combining circuit, and combining the two or more amplified analog baseband signals to generate a combined analog baseband signal using the controllable amplification and combining circuit.

In various embodiments, the method further includes generating the combined analog baseband signal in a first mode of the controllable amplification and combining circuit, and outputting the two or more amplified analog baseband signals in a second mode of the controllable amplification and combining circuit. According to a number of embodiments, the method further includes forming a receive beam in the first mode and operating with diversity communications in the second mode.

In a number of embodiments, the method further includes compensating for a DC offset of each of the two or more amplified analog baseband signals.

In some embodiments, the method further includes converting the combined analog baseband signal to a digital signal.

In various embodiments, the method further includes performing phase shifting in each of the radio frequency circuit channels at an intermediate frequency that is less than a frequency of the radio wave.

In several embodiments, the method further includes generating a plurality of clock signals using a plurality of local oscillators operating with a common timing reference signal, and providing each of the plurality of clock signals to a corresponding one of the plurality of radio frequency circuit channels.

In some embodiments, the method further includes generating a first intermediate frequency signal using a first radio frequency circuit channel of the plurality of radio frequency circuit channels, generating a second intermediate frequency signal using a second radio frequency circuit channel of the plurality of radio frequency circuit channels, and combining the first intermediate frequency signal and the second intermediate frequency signal.

In certain embodiments, the present disclosure relates to a communication system. The communication system includes an antenna array including a plurality of antenna elements, a plurality of radio frequency circuit channels each coupled to a corresponding one of the plurality of antenna elements, and a controllable amplification and combining circuit. The plurality of radio frequency circuit channels are operable to generate two or more analog baseband signals in response to the antenna array receiving a radio wave. Additionally, the controllable amplification and combining circuit is configured to generate two or more amplified analog baseband signals based on amplifying each of the two or more analog baseband signals with a separately controllable gain, and to combine the two or more amplified analog baseband signals to generate a combined analog baseband signal.

In various embodiments, the controllable amplification and combining circuit is configured to generate the combined analog baseband signal in a first mode, and to output the two or more amplified analog baseband signals in a second mode. According to a number of embodiments, the communication system operates with beamforming in the first mode and with diversity communications in the second mode.

In some embodiments, the controllable amplification and combining circuit includes two or more controllable gain input amplifiers configured to amplify the two or more analog baseband signals to generate the two or more amplified analog baseband signals. According to a number of embodiments, the controllable amplification and combining circuit further includes two or more DC offset compensation circuits each configured to provide a separately controllable DC offset correction to a corresponding one of the two or more controllable gain input amplifiers.

In several embodiments, the communication system further includes a data conversion and signal processing circuit including two or more analog-to-digital converters each configured to receive a corresponding one of the two or more amplified analog baseband signals.

In a number of embodiments, the plurality of radio frequency circuit channels each include a controllable phase shifter configured to provide phase shifting at an intermediate frequency that is less than a frequency of the radio wave.

In some embodiments, the communication system further includes a plurality of local oscillators each configured to provide at least one clock signal to a corresponding one of the plurality of radio frequency circuit channels. According to various embodiments, the plurality of local oscillators each include a phase-locked-loop configured to receive a common timing reference signal.

In several embodiments, the plurality of radio frequency circuit channels includes a first radio frequency circuit channel including a first mixer configured to generate a first intermediate frequency signal, and a second radio frequency circuit channel including a second mixer configured to generate a second intermediate frequency signal. According to a number of embodiments, the communication system further includes a combiner configured to generate a first analog baseband signal of the two or more analog baseband signals based on combining the first intermediate frequency signal and the second intermediate frequency signal.

In certain embodiments, the present disclosure relates to a semiconductor die. The semiconductor die includes a plurality of controllable gain input amplifiers configured to amplify a plurality of analog baseband signals to generate a plurality of amplified analog baseband signals, each of the plurality of controllable gain input amplifiers configured to amplify a corresponding one of the plurality of analog baseband signals with a separately controllable amount of gain. The semiconductor die further includes a plurality of selection circuits each configured to receive a respective one of the plurality of amplified baseband signals, the plurality of selection signals configured to combine the plurality of amplified analog baseband signals to generate a combined analog baseband signal in a first mode, and to output the plurality of amplified analog baseband signals in a second mode.

In a number of embodiments, the semiconductor die further includes a plurality of DC offset compensation circuits each configured to provide a separately controllable DC offset correction to a corresponding one of the plurality of controllable gain input amplifiers.

In several embodiments, the plurality of selection circuits are implemented as a plurality of cascode transistors.

In some embodiments, the plurality of controllable gain input amplifiers are implemented as a plurality of gain stages, the separately controllable amount of gain based on a number of the plurality of gain stages that are selected. According to a number of embodiments, the plurality of gain stages are weighted.

In various embodiments, the semiconductor die further includes a plurality of output buffers each configured to buffer a corresponding one of the plurality of amplified analog baseband signals.

In several embodiments, the semiconductor die further includes a plurality of analog-to-digital converters each configured to provide analog-to-digital conversion to a corresponding one of the plurality of amplified analog baseband signals in the second mode. According to a number of embodiments, a first analog-to-digital converter of the plurality of analog-to-digital converters is configured to provide analog-to-digital conversion to the combined analog baseband signal in the first mode. In accordance with various embodiments, one or more of the plurality of analog-to-digital converters are disabled in the first mode to reduce power consumption.

In certain embodiments, the present disclosure relates to a method of processing signals in a communication system. The method includes amplifying a plurality of analog baseband signals to generate a plurality of amplified analog baseband signals using a plurality of controllable gain input amplifiers, including amplifying each of the plurality of analog baseband signals using a corresponding one of the plurality of controllable gain input amplifiers. The method further includes separately controlling a gain of each of the plurality of controllable gain input amplifiers. The method further includes processing the plurality of amplified analog baseband signals using a signal selector that includes a plurality of selection circuits each receiving a corresponding one of the plurality of amplified analog baseband signals, including outputting a combined analog baseband signal in a first mode of the signal selector and outputting the plurality of amplified analog baseband signals in a second mode of the signal selector.

In some embodiments, the method further includes providing DC offset correction to the plurality of controllable gain input amplifiers using a plurality of DC offset compensation circuits, including correcting a DC offset of each of the plurality of controllable gain input amplifiers using a corresponding one of the plurality of DC offset compensation circuits.

In various embodiments, separately controlling a gain of each of the plurality of controllable gain input amplifiers includes controlling a number of active gain stages of each of the plurality of controllable gain input amplifiers.

In a number of embodiments, the method further includes buffering the plurality of amplified analog baseband signals.

In some embodiments, the method further includes providing analog-to-digital conversion of the plurality of amplified analog baseband signals using a plurality of analog-to-digital converters in the second mode. In accordance with several embodiments, the method further includes providing analog-to-digital conversion of the combined analog baseband signal using a first analog-to-digital converter of the plurality of analog-to-digital converters in the first mode. According to a number of embodiments, the method further includes deactivating one or more of the plurality of analog-to-digital converters in the first mode.

In certain embodiments, the present disclosure relates to a communication system. The communication system includes a plurality of radio frequency circuit channels configured to output a plurality of analog baseband signals, and a controllable amplification and combining circuit including a plurality of controllable gain input amplifiers configured to amplify the plurality of analog baseband signals to generate a plurality of amplified analog baseband signals, each of the plurality of controllable gain input amplifiers configured to amplify a corresponding one of the plurality of analog baseband signals with a separately controllable amount of gain. The controllable amplification and combining circuit further includes a plurality of selection circuits each configured to receive a respective one of the plurality of amplified baseband signals, the plurality of selection signals configured to combine the plurality of amplified analog baseband signals to generate a combined analog baseband signal in a first mode, and to output the plurality of amplified analog baseband signals in a second mode.

In various embodiments, the controllable amplification and combining circuit further includes a plurality of DC offset compensation circuits each configured to provide a separately controllable DC offset correction to a corresponding one of the plurality of controllable gain input amplifiers.

In a number of embodiments, the plurality of selection circuits are implemented as a plurality of cascode transistors.

In several embodiments, the plurality of controllable gain input amplifiers are implemented as a plurality of gain stages, and the separately controllable amount of gain based on a number of the plurality of gain stages that are selected. In accordance with some embodiments, the plurality of gain stages are weighted.

In various embodiments, the controllable amplification and combining circuit further includes a plurality of output buffers each configured to buffer a corresponding one of the plurality of amplified analog baseband signals.

In some embodiments, the communication system further includes a data conversion and signal processing circuit configured to receive the combined analog baseband signal in the first mode, and the plurality of amplified analog baseband signals in the second mode.

In several embodiments, the data conversion and signal processing circuit includes a plurality of analog-to-digital converters each configured to provide analog-to-digital conversion to a corresponding one of the plurality of amplified analog baseband signals in the second mode. In accordance with a number of embodiments, a first analog-to-digital converter of the plurality of analog-to-digital converters is configured to provide analog-to-digital conversion to the combined analog baseband signal in the first mode. According to various embodiments, the one or more of the plurality of analog-to-digital converters are disabled in the first mode to reduce power consumption.

In some embodiments, the communication system further includes an antenna array including a plurality of antenna elements coupled to the plurality of radio frequency circuit channels.

BRIEF DESCRIPTION OF THE DRAWINGS

Embodiments of this disclosure will now be described, by way of non-limiting example, with reference to the accompanying drawings.

DETAILED DESCRIPTION OF CERTAIN EMBODIMENTS

Figure 1:
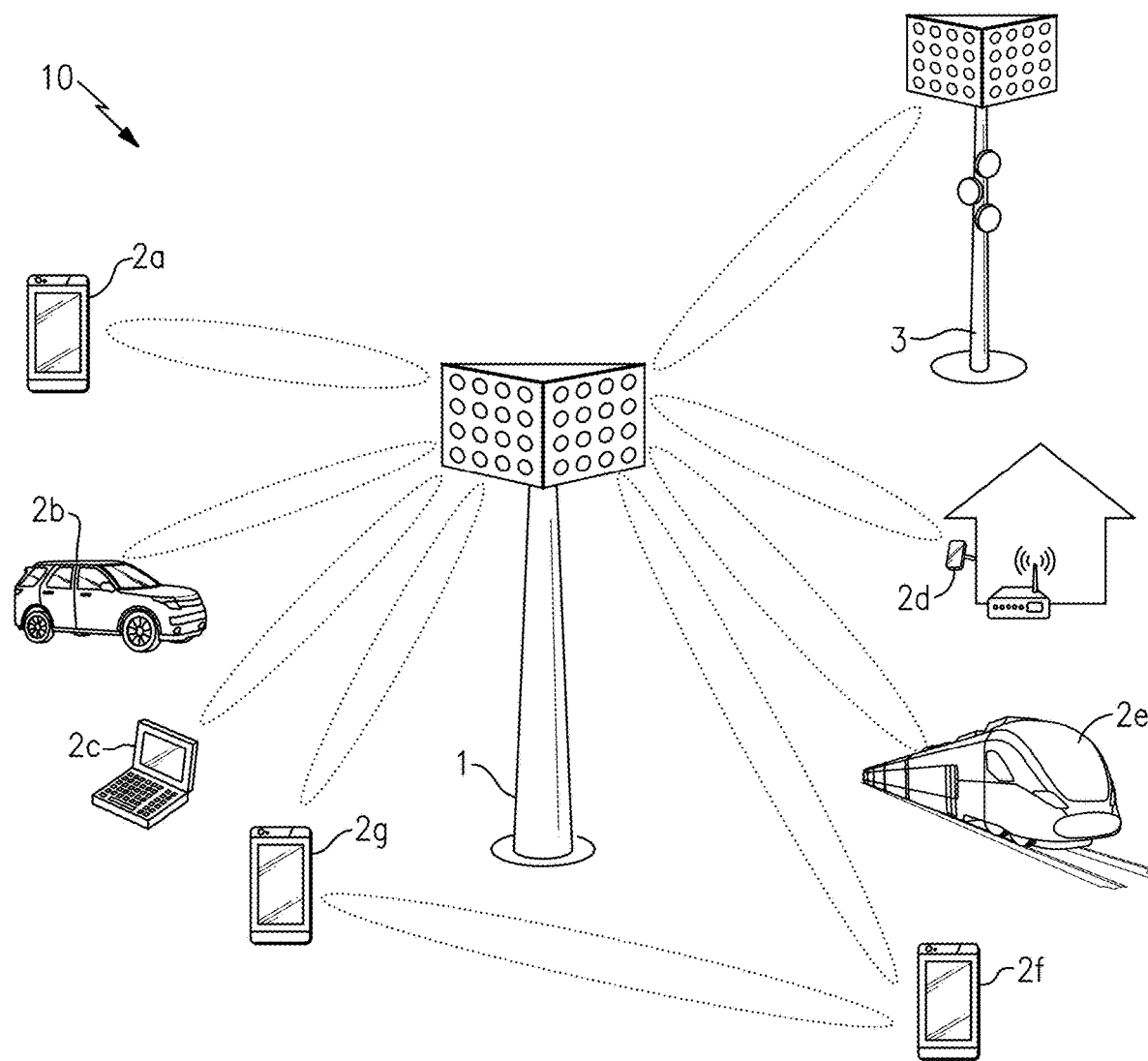
FIG. 1 is a schematic diagram of one example of a communication network.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The International Telecommunication Union (ITU) is a specialized agency of the United Nations (UN) responsible for global issues concerning information and communication technologies, including the shared global use of radio spectrum.

The 3rd Generation Partnership Project (3GPP) is a collaboration between groups of telecommunications standard bodies across the world, such as the Association of Radio Industries and Businesses (ARIB), the Telecommunications Technology Committee (TTC), the China Communications Standards Association (CCSA), the Alliance for Telecommunications Industry Solutions (ATIS), the Telecommunications Technology Association (TTA), the European Telecommunications Standards Institute (ETSI), and the Telecommunications Standards Development Society, India (TSDSI).

Working within the scope of the ITU, 3GPP develops and maintains technical specifications for a variety of mobile communication technologies, including, for example, second generation (2G) technology (for instance, Global System for Mobile Communications (GSM) and Enhanced Data Rates for GSM Evolution (EDGE)), third generation (3G) technology (for instance, Universal Mobile Telecommunications System (UMTS) and High Speed Packet Access (HSPA)), and fourth generation (4G) technology (for instance, Long Term Evolution (LTE) and LTE-Advanced).

The technical specifications controlled by 3GPP can be expanded and revised by specification releases, which can span multiple years and specify a breadth of new features and evolutions.

In one example, 3GPP introduced carrier aggregation (CA) for LTE in Release 10. Although initially introduced with two downlink carriers, 3GPP expanded carrier aggregation in Release 14 to include up to five downlink carriers and up to three uplink carriers. Other examples of new features and evolutions provided by 3GPP releases include, but are not limited to, License Assisted Access (LAA), enhanced LAA (eLAA), Narrowband Internet of things (NB-IOT), Vehicle-to-Everything (V2X), and High Power User Equipment (HPUE).

3GPP introduced Phase 1 of fifth generation (5G) technology in Release 15, and plans to introduce Phase 2 of 5G technology in Release 16 (targeted for 2019). Subsequent 3GPP releases will further evolve and expand 5G technology. 5G technology is also referred to herein as 5G New Radio (NR).

5G NR supports or plans to support a variety of features, such as communications over millimeter wave spectrum, beamforming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

FIG. 1 is a schematic diagram of one example of a communication network 10. The communication network 10 includes a macro cell base station 1, a small cell base station 3, and various examples of user equipment (UE), including a first mobile device 2a, a wireless-connected car 2b, a laptop 2c, a stationary wireless device 2d, a wireless-connected train 2e, a second mobile device 2f, and a third mobile device 2g.

Although specific examples of base stations and user equipment are illustrated in FIG. 1, a communication network can include base stations and user equipment of a wide variety of types and/or numbers.

For instance, in the example shown, the communication network 10 includes the macro cell base station 1 and the small cell base station 3. The small cell base station 3 can operate with relatively lower power, shorter range, and/or with fewer concurrent users relative to the macro cell base station 1. The small cell base station 3 can also be referred to as a femtocell, a picocell, or a microcell. Although the communication network 10 is illustrated as including two base stations, the communication network 10 can be implemented to include more or fewer base stations and/or base stations of other types.

Although various examples of user equipment are shown, the teachings herein are applicable to a wide variety of user equipment, including, but not limited to, mobile phones, tablets, laptops, IoT devices, wearable electronics, customer premises equipment (CPE), wireless-connected vehicles, wireless relays, and/or a wide variety of other communication devices. Furthermore, user equipment includes not only currently available communication devices that operate in a cellular network, but also subsequently developed communication devices that will be readily implementable with the inventive systems, processes, methods, and devices as described and claimed herein.

The illustrated communication network 10 of FIG. 1 supports communications using a variety of cellular technologies, including, for example, 4G LTE and 5G NR. In certain implementations, the communication network 10 is further adapted to provide a wireless local area network (WLAN), such as WiFi. Although various examples of communication technologies have been provided, the communication network 10 can be adapted to support a wide variety of communication technologies.

Various communication links of the communication network 10 have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

In certain implementations, user equipment can communicate with a base station using one or more of 4G LTE, 5G NR, and WiFi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed WiFi frequencies).

As shown in FIG. 1, the communication links include not only communication links between UE and base stations, but also UE to UE communications and base station to base station communications. For example, the communication network 10 can be implemented to support self-fronthaul and/or self-backhaul.

The communication links can operate over a wide variety of frequencies. In certain implementations, communications are supported using 5G NR technology over one or more frequency bands that are less than 6 Gigahertz (GHz) and/or over one or more frequency bands that are greater than 6 GHz. For example, the communication links can serve Frequency Range 1 (FR1), Frequency Range 2 (FR2), or a combination thereof. In one embodiment, one or more of the mobile devices support a HPUE power class specification.

In certain implementations, a base station and/or user equipment communicates using beamforming. For example, beamforming can be used to focus signal strength to overcome path losses, such as high loss associated with communicating over high signal frequencies. In certain embodiments, user equipment, such as one or more mobile phones, communicate using beamforming on millimeter wave frequency bands in the range of 30 GHz to 300 GHz and/or upper centimeter wave frequencies in the range of 6 GHz to 30 GHz, or more particularly, 24 GHz to 30 GHz.

Different users of the communication network 10 can share available network resources, such as available frequency spectrum, in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user. Ultra-reliable low latency communications (uRLLC) refers to technology for communication with very low latency, for instance, less than 2 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 10 of FIG. 1 can be used to support a wide variety of advanced communication features, including, but not limited to, eMBB, uRLLC, and/or mMTC.

Figure 2A:
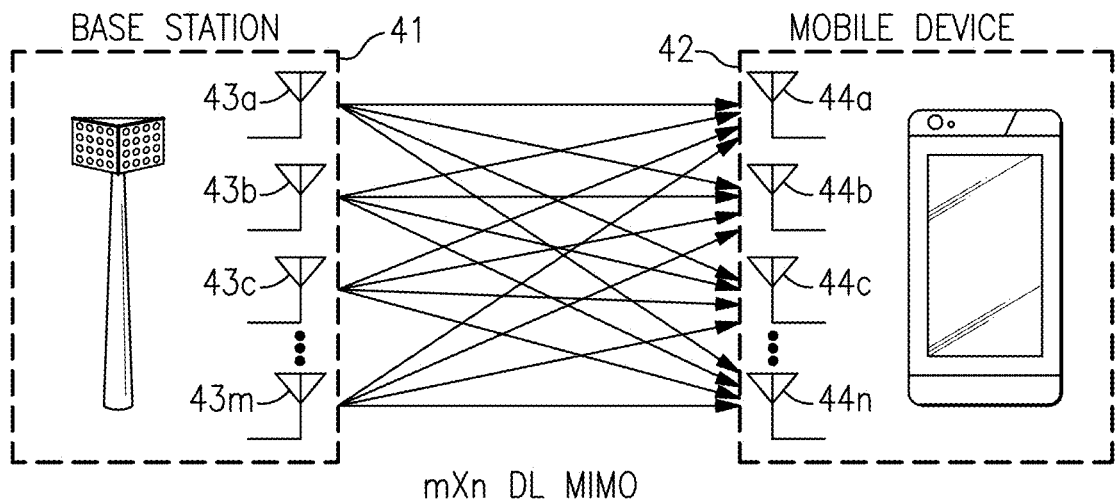
FIG. 2A is a schematic diagram of one example of a downlink channel using multi-input and multi-output (MIMO) communications.
Figure 2B:
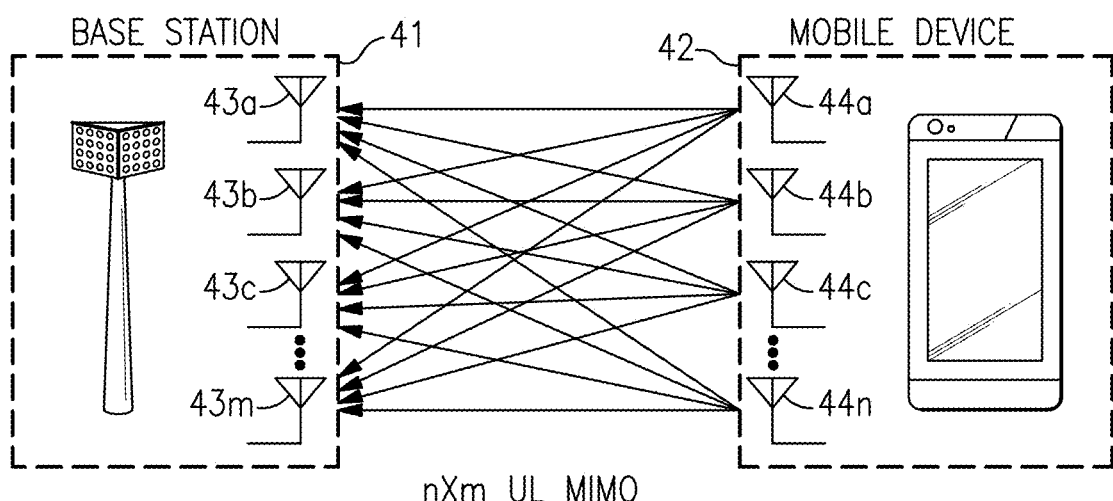
FIG. 2B is schematic diagram of one example of an uplink channel using MIMO communications.

FIG. 2A is a schematic diagram of one example of a downlink channel using multi-input and multi-output (MIMO) communications. FIG. 2B is schematic diagram of one example of an uplink channel using MIMO communications.

MIMO communications use multiple antennas for simultaneously communicating multiple data streams over common frequency spectrum. In certain implementations, the data streams operate with different reference signals to enhance data reception at the receiver. MIMO communications benefit from higher SNR, improved coding, and/or reduced signal interference due to spatial multiplexing differences of the radio environment.

MIMO order refers to a number of separate data streams sent or received. For instance, MIMO order for downlink communications can be described by a number of transmit antennas of a base station and a number of receive antennas for UE, such as a mobile device. For example, two-by-two (2×2) DL MIMO refers to MIMO downlink communications using two base station antennas and two UE antennas. Additionally, four-by-four (4×4) DL MIMO refers to MIMO downlink communications using four base station antennas and four UE antennas.

In the example shown in FIG. 2A, downlink MIMO communications are provided by transmitting using M antennas 43a, 43b, 43c, . . . 43m of the base station 41 and receiving using N antennas 44a, 44b, 44c, . . . 44n of the mobile device 42. Accordingly, FIG. 2A illustrates an example of m×n DL MIMO.

Likewise, MIMO order for uplink communications can be described by a number of transmit antennas of UE, such as a mobile device, and a number of receive antennas of a base station. For example, 2×2 UL MIMO refers to MIMO uplink communications using two UE antennas and two base station antennas. Additionally, 4×4 UL MIMO refers to MIMO uplink communications using four UE antennas and four base station antennas.

In the example shown in FIG. 2B, uplink MIMO communications are provided by transmitting using N antennas 44a, 44b, 44c, . . . 44n of the mobile device 42 and receiving using M antennas 43a, 43b, 43c, . . . 43m of the base station 41. Accordingly, FIG. 2B illustrates an example of n×m UL MIMO.

By increasing the level or order of MIMO, bandwidth of an uplink channel and/or a downlink channel can be increased.

MIMO communications are applicable to communication links of a variety of types, such as FDD communication links and TDD communication links.

Figure 2C:
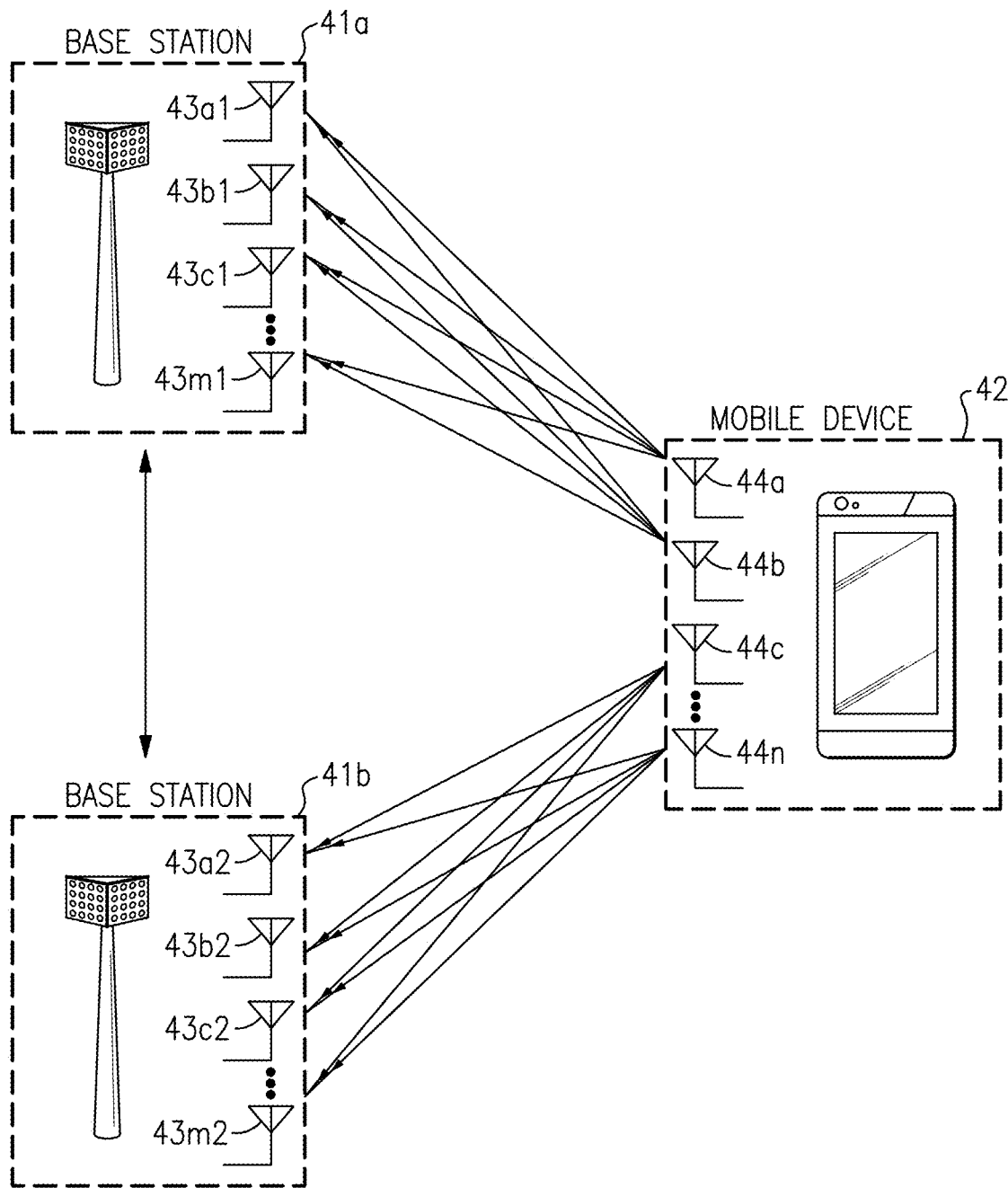
FIG. 2C is schematic diagram of another example of an uplink channel using MIMO communications.

FIG. 2C is schematic diagram of another example of an uplink channel using MIMO communications. In the example shown in FIG. 2C, uplink MIMO communications are provided by transmitting using N antennas 44a, 44b, 44c, . . . 44n of the mobile device 42. Additional a first portion of the uplink transmissions are received using M antennas 43a1, 43b1, 43c1, . . . 43m1 of a first base station 41a, while a second portion of the uplink transmissions are received using M antennas 43a2, 43b2, 43c2, . . . 43m2 of a second base station 41b. Additionally, the first base station 41a and the second base station 41b communication with one another over wired, optical, and/or wireless links.

The MIMO scenario of FIG. 2C illustrates an example in which multiple base stations cooperate to facilitate MIMO communications.

Figure 3A:
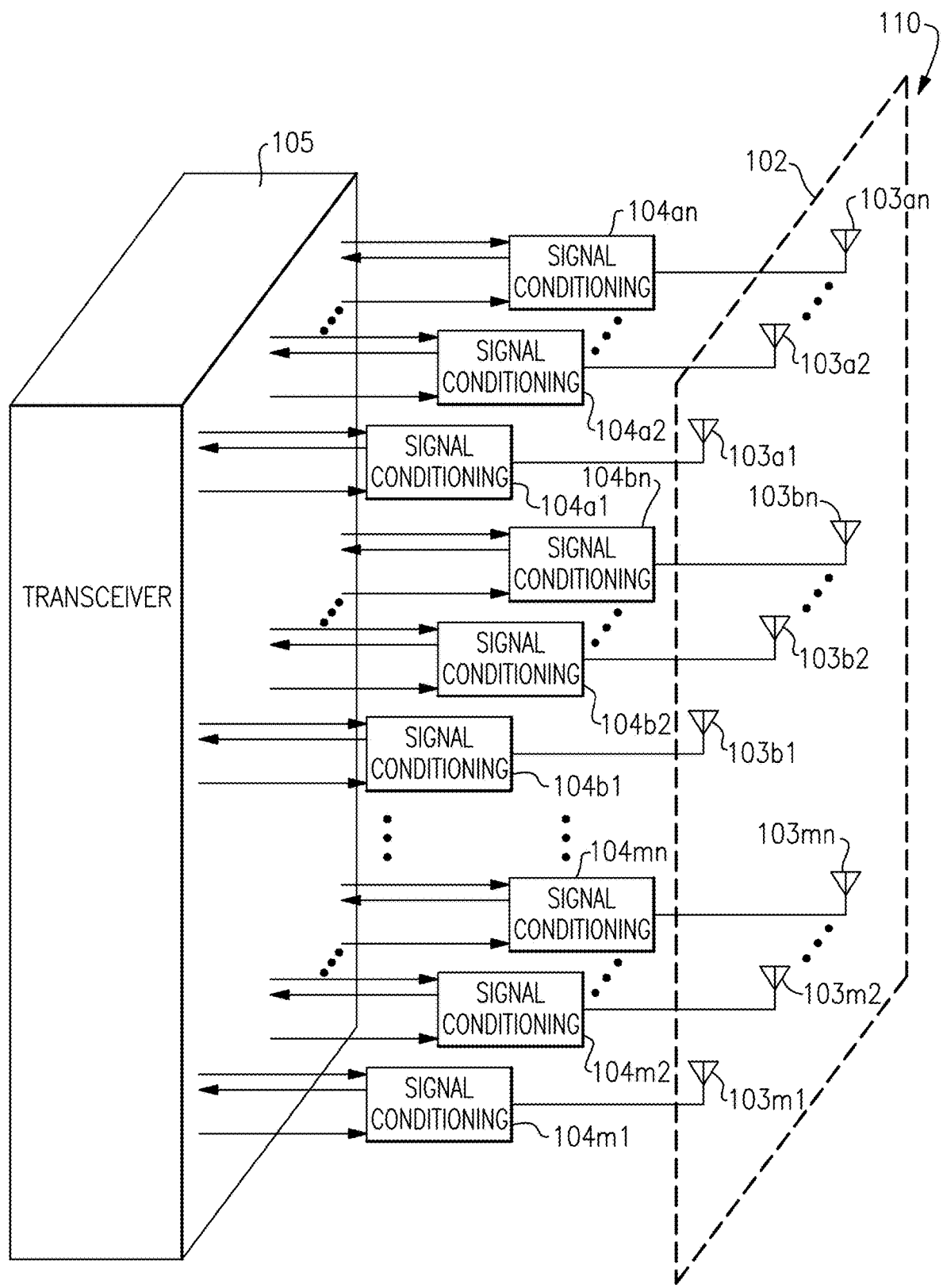
FIG. 3A is a schematic diagram of one example of a communication system that operates with beamforming.

FIG. 3A is a schematic diagram of one example of a communication system 110 that operates with beamforming. The communication system 110 includes a transceiver 105, signal conditioning circuits 104a1, 104a2 . . . 104an, 104b1, 104b2 . . . 104bn, 104m1, 104m2 . . . 104mn, and an antenna array 102 that includes antenna elements 103a1, 103a2 . . . 103an, 103b1, 103b2 . . . 103bn, 103m1, 103m2 . . . 103mn.

Communications systems that communicate using millimeter wave carriers (for instance, 30 GHz to 300 GHz), centimeter wave carriers (for instance, 3 GHz to 30 GHz), and/or other frequency carriers can employ an antenna array to provide beam formation and directivity for transmission and/or reception of signals.

For example, in the illustrated embodiment, the communication system 110 includes an array 102 of m×n antenna elements, which are each controlled by a separate signal conditioning circuit, in this embodiment. As indicated by the ellipses, the communication system 110 can be implemented with any suitable number of antenna elements and signal conditioning circuits.

With respect to signal transmission, the signal conditioning circuits can provide transmit signals to the antenna array 102 such that signals radiated from the antenna elements combine using constructive and destructive interference to generate an aggregate transmit signal exhibiting beam-like qualities with more signal strength propagating in a given direction away from the antenna array 102.

In the context of signal reception, the signal conditioning circuits process the received signals (for instance, by separately controlling received signal phases) such that more signal energy is received when the signal is arriving at the antenna array 102 from a particular direction. Accordingly, the communication system 110 also provides directivity for reception of signals.

The relative concentration of signal energy into a transmit beam or a receive beam can be enhanced by increasing the size of the array. For example, with more signal energy focused into a transmit beam, the signal is able to propagate for a longer range while providing sufficient signal level for RF communications. For instance, a signal with a large proportion of signal energy focused into the transmit beam can exhibit high effective isotropic radiated power (EIRP).

In the illustrated embodiment, the transceiver 105 provides transmit signals to the signal conditioning circuits and processes signals received from the signal conditioning circuits. As shown in FIG. 3A, the transceiver 105 generates control signals for the signal conditioning circuits. The control signals can be used for a variety of functions, such as controlling the gain and phase of transmitted and/or received signals to control beamforming.

Figure 3B:
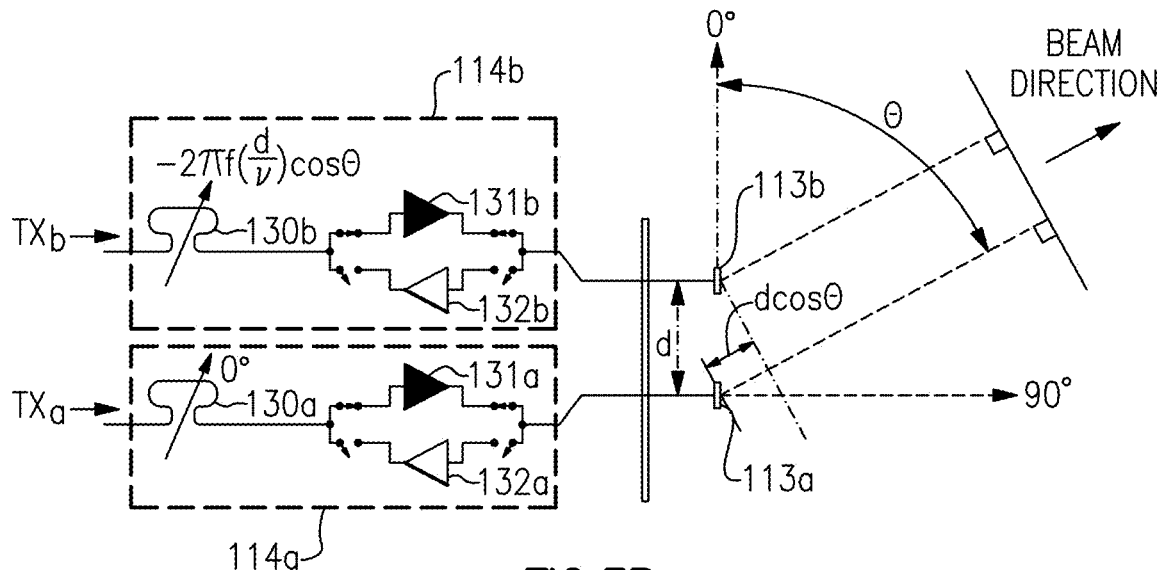
FIG. 3B is a schematic diagram of one example of beamforming to provide a transmit beam.

FIG. 3B is a schematic diagram of one example of beamforming to provide a transmit beam. FIG. 3B illustrates a portion of a communication system including a first signal conditioning circuit 114a, a second signal conditioning circuit 114b, a first antenna element 113a, and a second antenna element 113b.

Although illustrated as included two antenna elements and two signal conditioning circuits, a communication system can include additional antenna elements and/or signal conditioning circuits. For example, FIG. 3B illustrates one embodiment of a portion of the communication system 110 of FIG. 3A.

The first signal conditioning circuit 114a includes a first phase shifter 130a, a first power amplifier 131a, a first low noise amplifier (LNA) 132a, and switches for controlling selection of the power amplifier 131a or LNA 132a. Additionally, the second signal conditioning circuit 114b includes a second phase shifter 130b, a second power amplifier 131b, a second LNA 132b, and switches for controlling selection of the power amplifier 131b or LNA 132b.

Although one embodiment of signal conditioning circuits is shown, other implementations of signal conditioning circuits are possible. For instance, in one example, a signal conditioning circuit includes one or more band filters, duplexers, and/or other components.

In the illustrated embodiment, the first antenna element 113a and the second antenna element 113b are separated by a distance d. Additionally, FIG. 3B has been annotated with an angle $\Theta$, which in this example has a value of about 90° when the transmit beam direction is substantially perpendicular to a plane of the antenna array and a value of about 0° when the transmit beam direction is substantially parallel to the plane of the antenna array.

By controlling the relative phase of the transmit signals provided to the antenna elements 113a, 113b, a desired transmit beam angle $\Theta$ can be achieved. For example, when the first phase shifter 130a has a reference value of 0°, the second phase shifter 130b can be controlled to provide a phase shift of about $-2\pi f(d/v)\cos\Theta$ radians, where f is the fundamental frequency of the transmit signal, d is the distance between the antenna elements, v is the velocity of the radiated wave, and $\pi$ is the mathematic constant pi.

In certain implementations, the distance d is implemented to be about $\frac{1}{2}\lambda$, where $\lambda$ is the wavelength of the fundamental component of the transmit signal. In such implementations, the second phase shifter 130b can be controlled to provide a phase shift of about $-\pi\cos\Theta$ radians to achieve a transmit beam angle $\Theta$.

Accordingly, the relative phase of the phase shifters 130a, 130b can be controlled to provide transmit beamforming. In certain implementations, a baseband processor and/or a transceiver (for example, the transceiver 105 of FIG. 3A) controls phase values of one or more phase shifters and gain values of one or more controllable amplifiers to control beamforming.

Figure 3C:
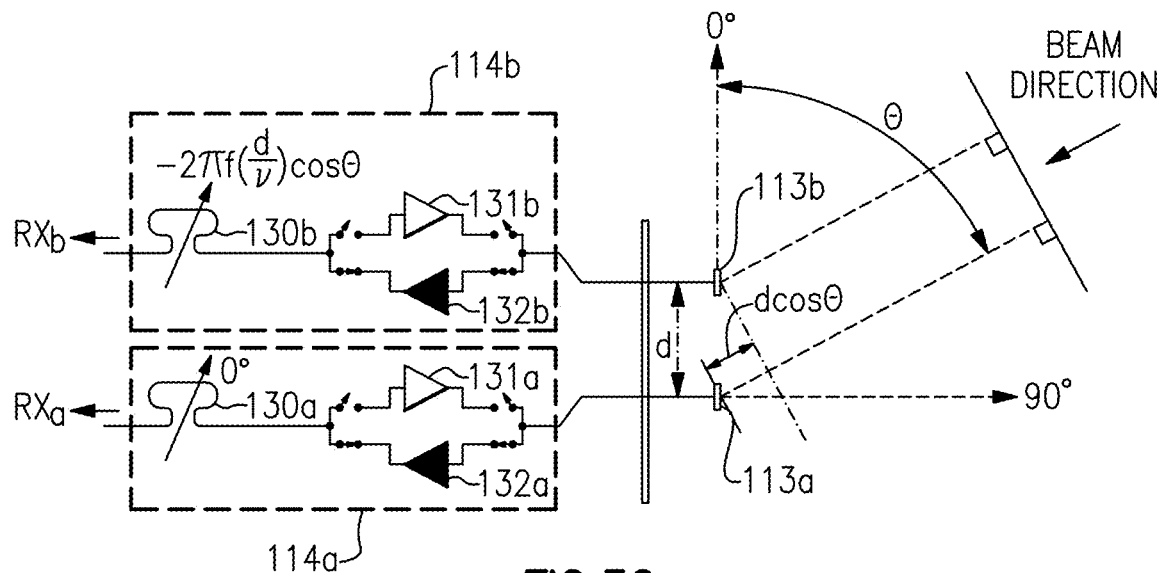
FIG. 3C is a schematic diagram of one example of beamforming to provide a receive beam.

FIG. 3C is a schematic diagram of one example of beamforming to provide a receive beam. FIG. 3C is similar to FIG. 3B, except that FIG. 3C illustrates beamforming in the context of a receive beam rather than a transmit beam.

As shown in FIG. 3C, a relative phase difference between the first phase shifter 130a and the second phase shifter 130b can be selected to about equal to $-2\pi f(d/v)\cos\Theta$ radians to achieve a desired receive beam angle $\Theta$. In implementations in which the distance d corresponds to about $\frac{1}{2}\lambda$, the phase difference can be selected to about equal to $-\pi\cos\Theta$ radians to achieve a receive beam angle $\Theta$.

Although various equations for phase values to provide beamforming have been provided, other phase selection values are possible, such as phase values selected based on implementation of an antenna array, implementation of signal conditioning circuits, and/or a radio environment.

Examples of Multi-Antenna Systems with Analog Signal Combining at Baseband

Antenna arrays can be used in a wide variety of applications. For example, antenna arrays can be used to transmit and/or receive radio frequency (RF) signals in base stations, network access points, mobile phones, tablets, laptops, computers, and/or other communications devices. Moreover, in certain implementations, separate antenna arrays are deployed for transmission and reception.

Communications devices that utilize millimeter wave carriers (for instance, 30 GHz to 300 GHz), centimeter wave carriers (for instance, 3 GHz to 30 GHz), and/or other carrier frequencies can employ an antenna array to provide beam forming, MIMO communications, and/or diversity communications.

Apparatus and methods for multi-antenna communications are provided. In certain embodiments, a communication system includes an antenna array including a plurality of antenna elements, and a plurality of RF circuit channels each coupled to a corresponding one of the antenna elements. The plurality of RF circuit channels generate two or more analog baseband signals in response to the antenna array receiving a radio wave. The communication system further includes a controllable amplification and combining circuit that generates two or more amplified analog baseband signals based on amplifying each of the two or more analog baseband signals with a separately controllable gain, and that combines the two or more amplified analog baseband signals to generate a combined analog baseband signal.

The controllable amplification and combining circuit can provide different amounts of amplification to each of the analog baseband signals. In such implementations, the combined analog baseband signal corresponds to a weighted sum of the two or more analog baseband signals.

In certain implementations, the controllable amplification and combining circuit is configurable in multiple modes including a first mode in which the two or more amplified analog baseband signals are combined to generate the combined analog baseband signal, and a second mode in which the two or more amplified analog baseband signals are outputted without combining. The amount of amplification provided can vary from signal to signal in the second mode.

Implementing the controllable amplification and combining circuit with multiple operating modes can provide a number of advantages, including allowing both beamforming in the first mode and diversity communications in the second mode. This in turn can lead to higher signal-to-noise ratio (SNR), communication at greater distances, higher data rates, and/or communication in harsher radio environments. Furthermore, DC offset correction can be provided for each amplified analog baseband signal, thereby providing DC offset correction for each channel with reduced complexity and/or with higher accuracy.

In certain implementations, each RF circuit channel receives one or more clock signals for downconversion from a corresponding local oscillator. Additionally, the local oscillators each receive a common timing reference signal for phase and/or frequency detection. By implementing the communication system in this manner, a number of advantages can be realized, including, but not limited to, lower current consumption in the local oscillators and/or uncorrelated noise between channels after RF.

In certain implementations, phase shifting is performed at least in part at intermediate frequency (IF). For example, each RF circuit channel can include an RF-to-IF mixer for downconverting a received RF signal to generate an IF signal (which can be an RF signal of lower frequency than the received RF signal), and an IF phase shifter for providing a desired amount of phase shift to the IF signal. Performing phase shifting at least in part at IF can provide a number of advantages, including, for example, lower loss and/or relaxed design constraints arising from performing phase shifting at decreased frequency relative to that of the received radio wave.

Figure 4A:
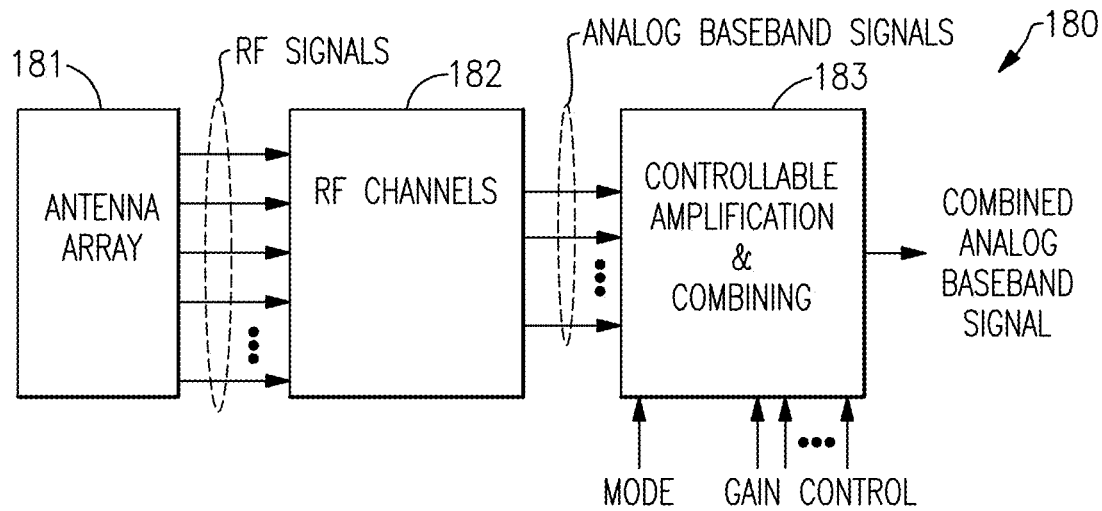
FIG. 4A is a schematic diagram of one embodiment of a communication system operating in a first mode.

FIG. 4A is a schematic diagram of one embodiment of a communication system 180 operating in a first mode. The communication system 180 includes an antenna array 181, RF circuit channels 182, and a controllable amplification and combining circuit 183.

The RF circuit channels 182 each receive an RF signal from a corresponding antenna element of the antenna array 181 in response to a radio wave. Additionally, the RF circuit channels 182 process the RF signals to generate multiple analog baseband signals. Thus, the RF circuit channels 182 operate in part to provide downconversion. In certain implementations, the RF circuit channels 182 process k RF signals and to generate l analog baseband signals, where k and l are each an integer greater than or equal to 2. The integers k and l can be the same or different.

As shown in FIG. 4A, the controllable amplification and combining circuit 183 receives the analog baseband signals, gain control signals for controlling an amount of gain provided to each of the analog baseband signals, and a mode control signal. The mode control signal operates to control the communication system 180 in one of multiple modes including at least a first mode and a second mode.

In FIG. 4A, the communication system 180 is depicted operating in the first mode, in which the controllable amplification and combining circuit 183 combines the analog baseband signals to generate a combined analog baseband signal. When combining the analog baseband signals, the controllable amplification and combining circuit 183 provides gain to each analog baseband signal based on the indicated amount of gain by the gain control signals. The settings for gain can be the same or different for each analog baseband signal, and thus the combined analog baseband signal corresponds to a weighted sum of the analog baseband signals.

Figure 4B:
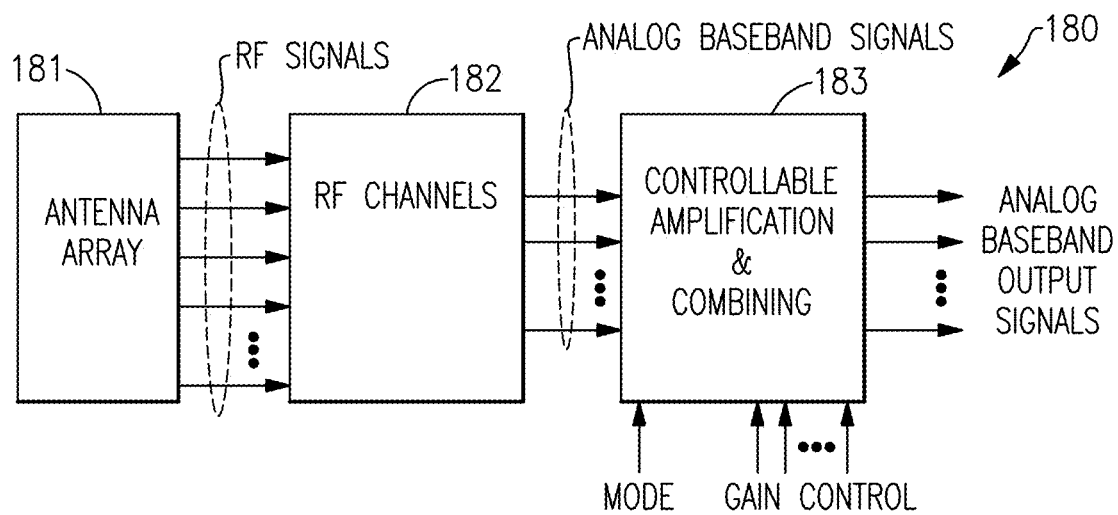
FIG. 4B is a schematic diagram of the communication system of FIG. 4B operating in a second mode.

FIG. 4B is a schematic diagram of the communication system 180 of FIG. 4B operating in a second mode.

When operating in the second mode, the communication system 180 outputs multiple analog baseband output signals without combining. The analog baseband output signals are also referred to as amplified analog baseband signals.

With reference to FIGS. 4A and 4B, the communication system 180 is operable in a first mode in which the analog baseband signals are amplified and combined to generate the combined analog baseband signal, and a second mode in which the analog baseband signals are amplified and outputted without analog combining at baseband. The amount of amplification provided the analog baseband signals can also vary from signal to signal in the second mode.

Implementing the controllable amplification and combining circuit 183 with multiple operating modes can provide a number of advantages, including allowing both beamforming in the first mode and diversity communications in the second mode. This in turn can lead to higher SNR, communication at greater distances, higher data rates, and/or communication in harsher radio environments. Furthermore, DC offset correction can be provided for each amplified analog baseband signal, thereby providing DC offset correction for each channel with reduced complexity and/or with higher accuracy.

Figure 5A:
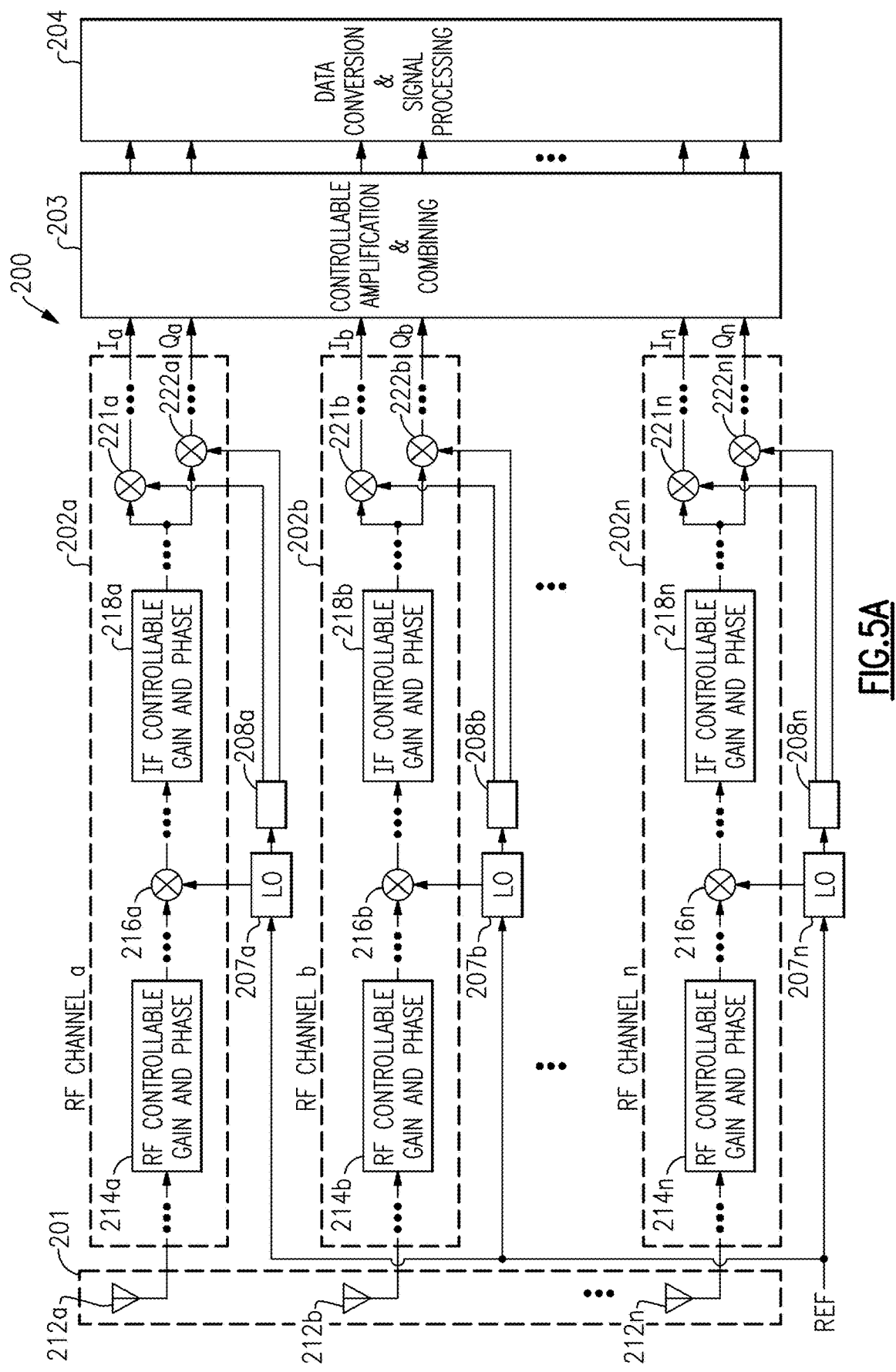
FIG. 5A is a schematic diagram of a communication system according to another embodiment.

FIG. 5A is a schematic diagram of a communication system 200 according to one embodiment. The communication system 200 includes an antenna array 201, RF circuit channels 202a, 202b, ... 202n, a controllable amplification and combining circuit 203, a data conversion and signal processing circuit 204, local oscillators (LOs) 207a, 207b, ... 207n, and I/Q dividers 208a, 208b, ... 208n. Although circuitry for three signal channels is depicted, more or fewer components can be included as indicated by the ellipses.

The antenna array 201 includes antenna elements 212a, 212b, ... 212n. Although three antenna elements are illustrated, the communication system 200 can include more or fewer antenna elements as indicated by the ellipses. The antenna elements 212a, 212b, ... 212n can be implemented in a wide variety of ways, including, but not limited to, using patch antenna elements, dipole antenna elements, ceramic resonators, stamped metal antennas, and/or laser direct structuring antennas. Moreover, antenna elements can be arrayed in other patterns or configurations, including, for instance, rectangular arrays, linear arrays, and/or arrays using non-uniform arrangements of antenna elements.

In the illustrated embodiment, the RF circuit channel 202a includes an RF controllable gain and phase circuit 214a, an RF-to-IF mixer 216a, an IF controllable gain and phase circuit 218a, an I-path mixer 221a, and a Q-path mixer 222a. Similarly, the RF circuit channel 202b includes an RF controllable gain and phase circuit 214b, an RF-to-IF mixer 216b, an IF controllable gain and phase circuit 218b, an I-path mixer 221b, and a Q-path mixer 222b. Likewise, the RF circuit channel 202n includes an RF controllable gain and phase circuit 214n, an RF-to-IF mixer 216n, an IF controllable gain and phase circuit 218n, an I-path mixer 221n, and a Q-path mixer 222n.

Although one example implementation of the RF circuit channels 202a, 202b, ... 202n is shown, the teachings herein are applicable to RF circuit channels implemented in a wide variety of ways.

In the illustrated embodiment, the LOs 207a, 207b, ... 207n generate clock signals for the RF-to-IF mixers 216a, 216b, ... 216n, respectively. Additionally, the LOs 207a, 207b, ... 207n each receive a common timing reference (REF), which is used by each LO for phase and/or frequency detection. By providing a common timing reference to distributed LOs, reduced current consumption is realized relative to an implementation using a single LO that distributes a common clock signal to the mixers. Moreover, the communication system 200 can have uncorrelated phase noise after RF, and thus operates with superior SNR relative to a communication system operating with fully synchronized timing.

As shown in FIG. 5A, the LOs 207a, 207b, ... 207n also provide clock signals to the I/Q dividers 208a, 208b, ... 208n, respectively. The clock signals provided to the I/Q dividers 208a, 208b, ... 208n can be the same or different as the clock signals provided to the RF-to-IF mixers 216a, 216b, ... 216n. The I/Q dividers 208a, 208b, ... 208n operate to provide frequency division to generate clock signals suitable for controlling the I-path mixers 221a, 221b, ... 221n and Q-path mixers 222a, 222b, ... 222n.

As shown in FIG. 5A, each of the RF circuit channels 202a, 202b, ... 202n outputs an analog baseband signal including an I-component and a Q-component. For example, the RF circuit channel 202a outputs an analog baseband signal $I_a$, $Q_a$, the RF circuit channel 202b outputs an analog baseband signal $I_b$, $Q_b$, and the RF circuit channel 202n outputs an analog baseband signal $I_n$, $Q_n$.

The controllable amplification and combining circuit 203 processes the analog baseband signals from the RF circuit channels 202a, 202b, ... 202n to generate one or more analog signals for the data conversion and signal processing circuit 204.

In certain implementations, the controllable amplification and combining circuit 203 is configurable in multiple modes. The multiple modes include a first mode in which the analog baseband signals are each amplified by a separately controllable gain to generate amplified analog baseband signals, which are combined to generate a combined analog baseband signal for the data conversion and signal processing circuit 203. In this example, the combined analog baseband signal includes I and Q components, and thus is implemented using quadrature signaling. The multiple modes further include a second mode in which the analog baseband signals are outputted to the data conversion and signal processing circuit 203 without combining. When operating in the first mode and/or the second mode, the controllable amplification and combining circuit 203 can provide a controllable amount of gain to each analog baseband signal. Thus, the amount of amplification provided can vary from signal to signal.

Implementing the controllable amplification and combining circuit 203 with multiple modes allows the communication system 200 to provide beamforming in the first mode and diversity communications in the second mode. Furthermore, DC offset correction can be provided for each input to the controllable amplification and combining circuit 203, thereby providing DC offset correction with reduced complexity and/or with higher accuracy.

In the illustrated embodiment, the IF controllable gain and phase circuits 218a, 218b, ... 218n are included to provide phase shifting at least in part at IF. Performing phase shifting at least in part at IF can provide a number of advantages, including, for example, lower loss and/or relaxed design constraints arising from performing phase shifting at lower frequency relative to the frequency of the radio wave received by the antenna array 201.

Figure 5B:
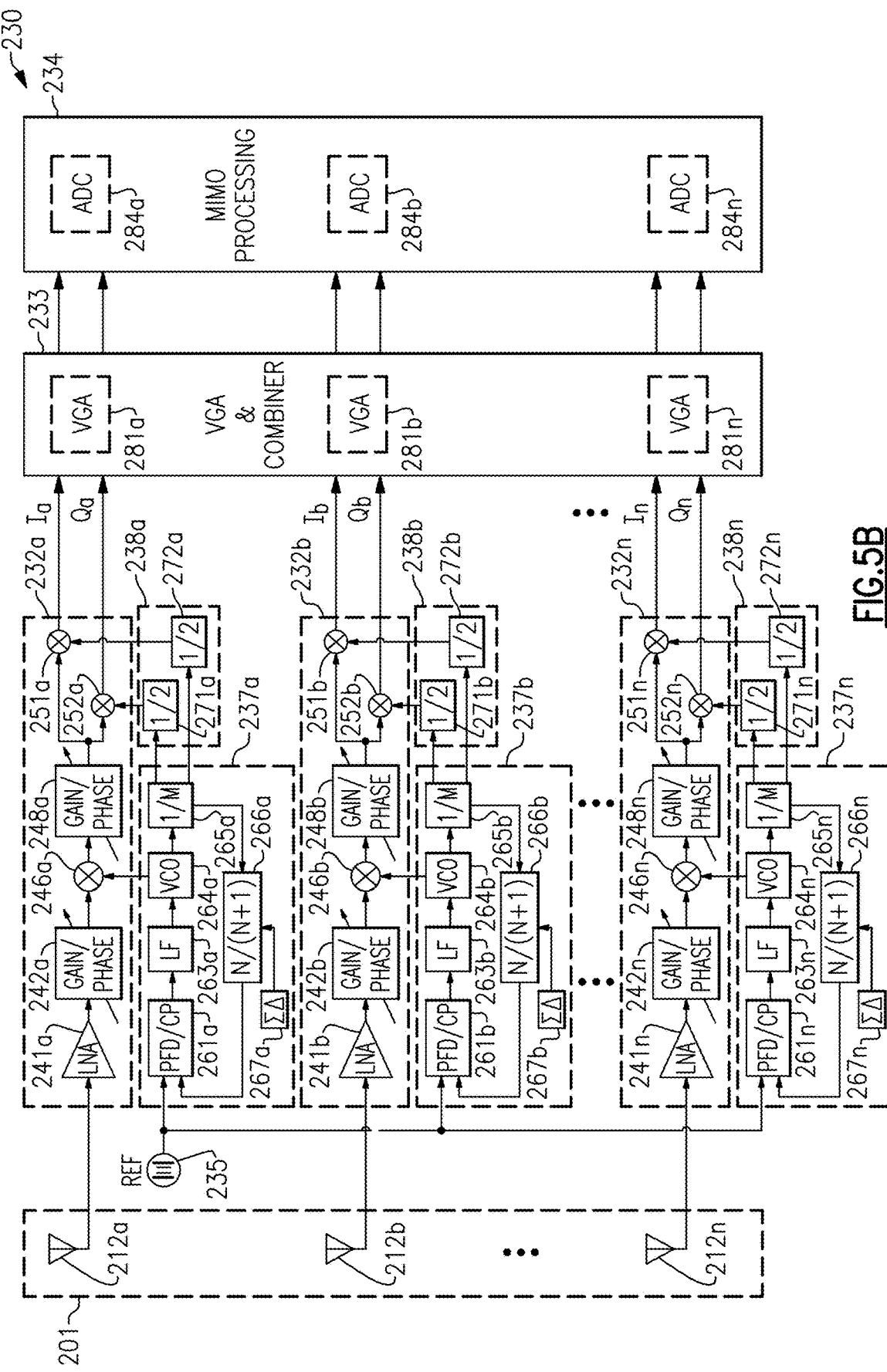
FIG. 5B is a schematic diagram of a communication system according to another embodiment.

FIG. 5B is a schematic diagram of a communication system 230 according to another embodiment. The communication system 230 includes an antenna array 201, RF circuit channels 232a, 232b, ... 232n, a variable gain amplifier (VGA) and combiner circuit 233, a MIMO processing circuit 234, a timing reference generator 235, LOs 237a, 237b, ... 237n, and I/Q dividers 238a, 238b, ... 238n. Although circuitry for three signal channels is depicted, more or fewer components can be included as indicated by the ellipses.

The communication system 230 of FIG. 5B is similar to the communication system 200 of FIG. 5A, except that the communication system 230 illustrates specific implementations of certain circuitry.

For example, as shown in FIG. 5B, the RF circuit channel 232a includes an LNA 241a, an RF VGA phase shifter 242a, an RF-to-IF mixer 246a, an IF automatic gain control (AGC) phase shifter 248a, an I-path mixer 251a, and a Q-path mixer 252a. Likewise, the RF circuit channel 232b includes an LNA 241b, an RF VGA phase shifter 242b, an RF-to-IF mixer 246b, an IF AGC phase shifter 248b, an I-path mixer 251b, and a Q-path mixer 252b. Similarly, the RF circuit channel 232n includes an LNA 241n, an RF VGA phase shifter 242n, an RF-to-IF mixer 246n, an IF AGC phase shifter 248n, an I-path mixer 251n, and a Q-path mixer 252n.

Furthermore, the LO 237a includes a phase and/or frequency detector (PFD) and charge pump (CP) 261a, a loop filter 263a, a voltage controlled oscillator (VCO) 264a, an output divider 265a (1 over integer M, in this example), a feedback divider 266a (N/N+1, in this example), and a sigma delta (ΣΔ) modulator 267a. Similarly, the LO 237b includes a PFD/CP 261b, a loop filter 263b, a VCO 264b, an output divider 265b, a feedback divider 266b, and ΣΔ modulator 267b. Likewise, the LO 237n includes a PFD/CP 261n, a loop filter 263n, a VCO 264n, an output divider 265n, a feedback divider 266n, and ΣΔ modulator 267n.

The I/Q divider 238a includes a first divider 271a (divide by 2, in this example) and a second divider 272a (divide by 2, in this example). Likewise, the I/Q divider 238b includes a first divider 271b and a second divider 272b. Similarly, the I/Q divider 238n includes a first divider 271n and a second divider 272n.

With continuing reference to FIG. 5B, the VGA and combiner circuit 233 includes VGA combining circuits 281a, 281b, ... 281n. Additionally, the MIMO processing circuit 234 includes ADCs 284a, 284b, ... 284n. In certain implementations, the ADCs 284a, 284b, ... 284n include an I-path ADC and a Q-path ADC for each RF circuit channel.

Figure 6A:
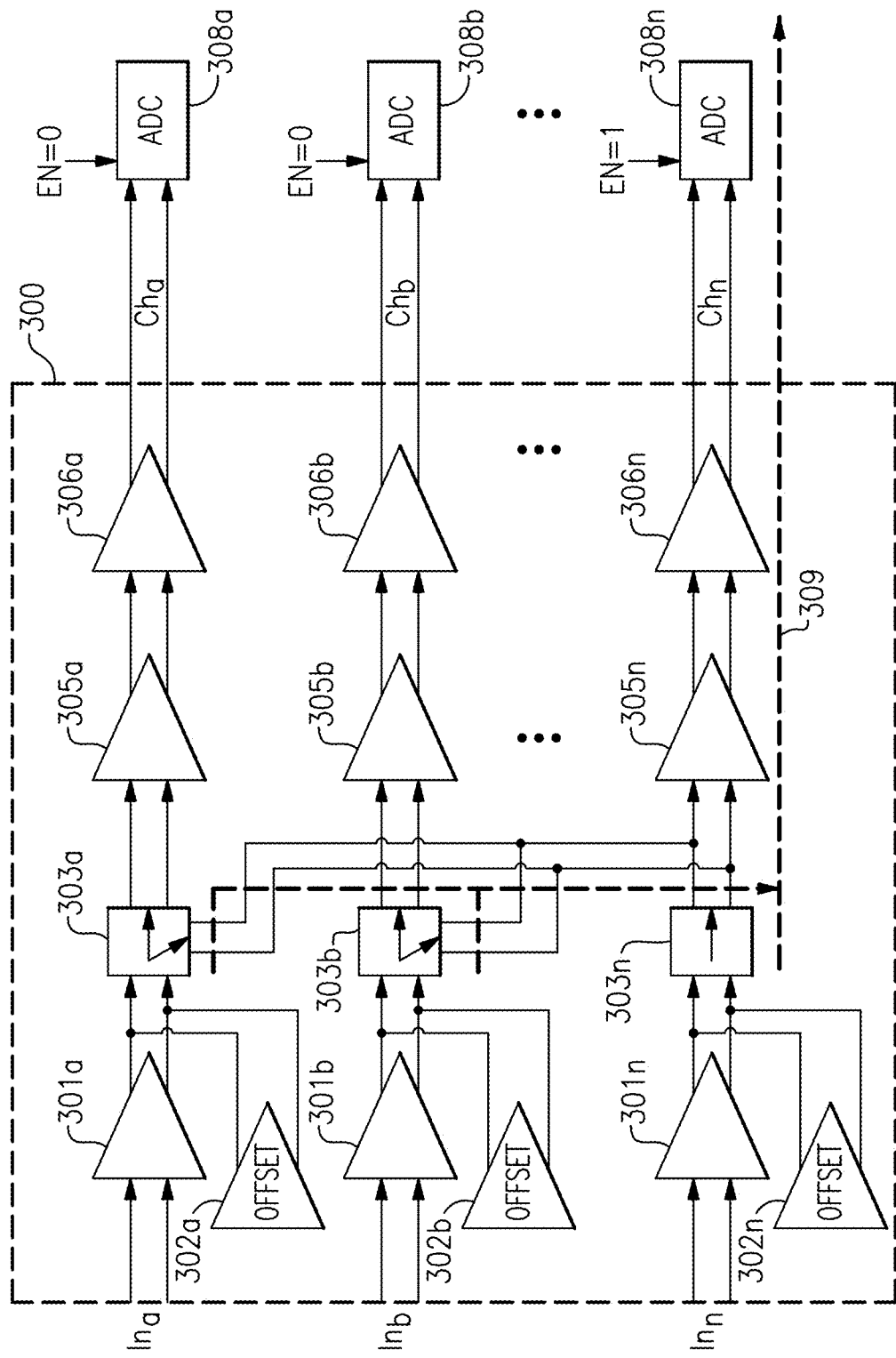
FIG. 6A is a schematic diagram of one embodiment of a controllable amplification and combining circuit in a first mode of operation.
Figure 6B:
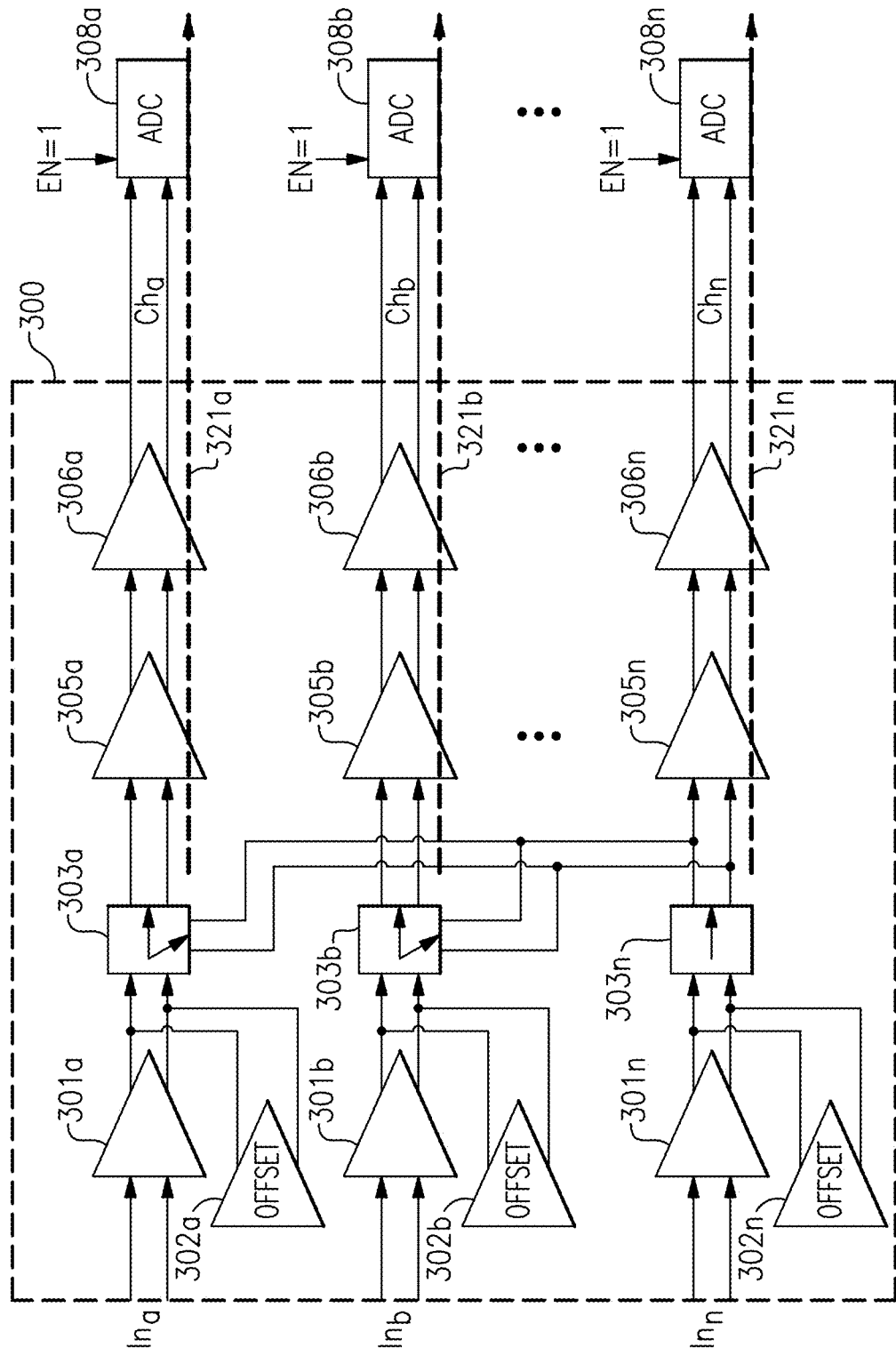
FIG. 6B is a schematic diagram of the controllable amplification and combining circuit of FIG. 6A in a second mode of operation.

FIG. 6A is a schematic diagram of one embodiment of a controllable amplification and combining circuit 300 in a first mode of operation. FIG. 6B is a schematic diagram of the controllable amplification and combining circuit 300 of FIG. 6A in a second mode of operation. The controllable amplification and combining circuit 300 is coupled to the ADCs 308a, 308b, . . . 308n of a data conversion and signal processing circuit, such as a MIMO processing circuit. The analog signals outputted from the controllable amplification and combining circuit 300 are associated with channels $Ch_a$, $Ch_b$, . . . $Ch_n$.

Although one embodiment of a controllable amplification and combining circuit is shown, the teachings herein are applicable to controllable amplification and combining circuits implemented in a wide variety of ways.

With reference to FIGS. 6A and 6B, the controllable amplification and combining circuit 300 includes controllable gain input amplifiers 301a, 301b, . . . 301n, DC offset compensation circuits 302a, 302b, . . . 302n, selection circuits 303a, 303b, . . . 303n, first output buffers 305a, 305b, . . . 305n, and second output buffers 306a, 306b, . . . 306n. The output buffers can have fixed or controllable gain. The selection circuits 303a, 303b, . . . 303n are also collectively referred to herein as a signal selector.

The controllable amplification and combining circuit 300 is implemented differentially, in this embodiment. However, other types of signaling can be used, such as single-ended signaling or a combination of differential and signal-ended signaling.

The controllable gain input amplifiers 301a, 301b, . . . 301n provide controllable amplification to input signals $In_a$, $In_b$, . . . $In_n$. The gain provided by the amplifiers 301a, 301b, . . . 301n can be controlled in a wide variety of ways, including, but not limited to, by a transceiver or radio frequency integrated circuit (RFIC) over an interface, such as a MIPI RFFE interface. In certain implementations, the input signals $In_a$, $In_b$, . . . $In_n$ correspond to I-path signals (for instance, $I_a$, $I_b$, . . . $I_n$ of FIG. 5A or 5B), and another group of controllable gain input amplifiers and associated circuits process Q-path signals (for instance, $Q_a$, $Q_b$, . . . $Q_n$ of FIG. 5A or 5B). Accordingly, in certain implementations multiple instantiations of the controllable amplification and combining circuit 300 are included.

A state of the selection circuits 303a, 303b, . . . 303n changes based on a mode of the controllable amplification and combining circuit 300. The selected mode can be controlled in a wide variety of ways, including, but not limited to, by a transceiver or RFIC over a MIPI RFFE interface or other suitable interface.

As shown in FIG. 6A, the controllable amplification and combining circuit 300 generates a combined analog baseband signal 309 in the first mode. Since the gain of the controllable gain input amplifiers 301a, 301b, . . . 301n can be separately controlled, the combined analog baseband signal 309 is generated by a weighted sum of the input signals $In_a$, $In_b$, . . . $In_n$, in this embodiment. In certain implementations, unused ADCs are turned off in the first mode to conserve power. For example, as shown in FIG. 6A, the ADC that is used can have an enable signal (EN) set to an enabled state (EN=1, in this example), while the ADCs that are unused can have the enable signal set to a disabled state (EN=0, in this example). In certain implementations, the ADCs are enabled or disabled using data receiver over a chip interface.

As shown in FIG. 6B, the controllable amplification and combining circuit 300 generates analog baseband signals 321a, 321b, . . . 321n in the second mode. In certain implementations, the controllable amplification and combining circuit 300 separately controls the gain of the analog baseband signals 321a, 321b, . . . 321n.

Implementing a controllable amplification and combining circuit with multiple modes provides a number of advantages, including allowing both beamforming in the first mode and diversity communications in the second mode. This in turn can lead to higher SNR, communication at greater distances, communication at greater data rates, and/or communication in harsher radio environments.

Furthermore, DC offset correction can be provided for each input to the controllable amplification and combining circuit, thereby providing DC offset correction with reduced complexity and/or with higher accuracy. For example, as shown in FIG. 6B, the DC offset compensation circuits 302a, 302b, . . . 302n provide a differential output signal to compensate for a DC offset of $Ch_a$, $Ch_b$, . . . $Ch_n$, respectively. The amount of DC offset compensation provided by each of the DC offset compensation circuits 302a, 302b, . . . 302n can be controlled in a wide variety of ways, including, but not limited to, by a transceiver or RFIC over a MIPI RFFE interface or other suitable interface.

In certain embodiments, the controllable amplification and combining circuit 300 is implemented on a semiconductor die, which can be incorporated into a radio frequency module. In certain implementations, the ADCs 308a, 308b, . . . 308n are also included on the semiconductor die. In other implementations, the ADCs 308a, 308b, . . . 308n are included a second semiconductor die, which can be incorporated with the first semiconductor die in a multi-chip module.

Figure 7:
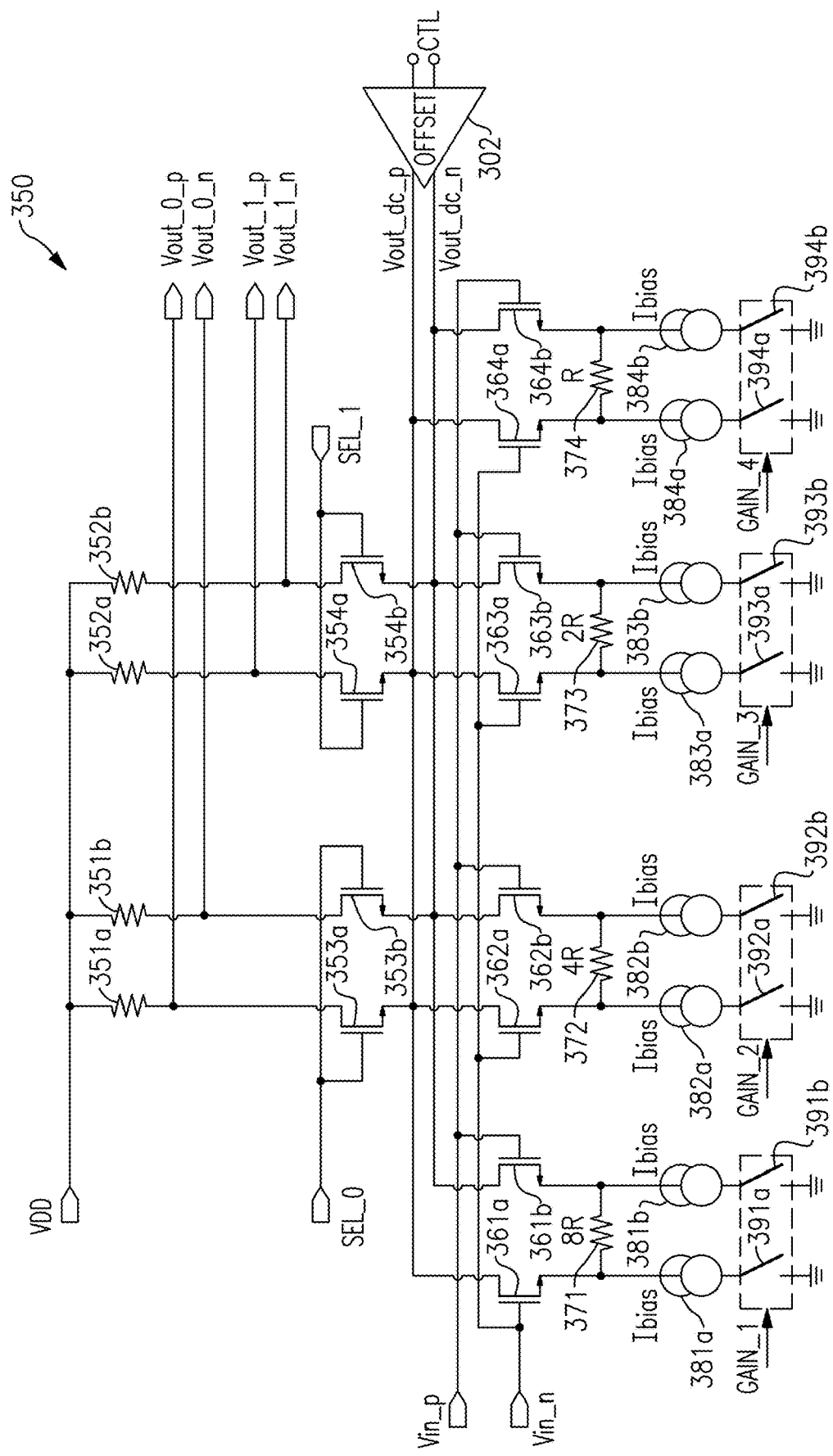
FIG. 7 is a schematic diagram of one embodiment of a portion of the controllable amplification and combining circuit of FIGS. 6A and 6B.

FIG. 7 is a schematic diagram of one embodiment of a portion of the controllable amplification and combining circuit 300 of FIGS. 6A and 6B. The illustrated circuitry 350 includes a first pair of load resistors 351a-351b, a second pair of load resistors 352a-352b, a first pair of selection transistors 353a-353b, a second pair of selection transistors 354a-354b, a first pair of signal amplification transistors 361a-361b, a second pair of signal amplification transistors 362a-362b, a third pair of signal amplification transistors 363a-363b, a fourth pair of signal amplification transistors 364a-364b, a first weighted resistor 371, a second weighted resistor 372, a third weighted resistor 373, a fourth weighted resistor 374, a first pair of bias current sources 381a-381b, a second pair of bias current sources 382a-382b, a third pair of bias current sources 383a-383b, a fourth pair of bias current sources 384a-384b, a first pair of gain control switches 391a-391b, a second pair of gain control switches 392a-392b, a third pair of gain control switches 393a-393b, a fourth pair of gain control switches 394a-394b, and a DC offset compensation circuit 302. The circuitry 350 is powered by a supply voltage VDD and ground.

The circuitry 350 illustrates one implementation of a controllable gain input amplifier, a selection circuit, and a DC offset compensation circuit. For example, the circuitry 350 can be used to implement the controllable gain input amplifier 301a, the selection circuit 303a, and the DC offset compensation circuit 302a of FIGS. 6A and 6B. Additionally, multiple instantiations of the circuitry 350 can be used to implement the controllable amplification and combining circuit 300 of FIGS. 6A and 6B. Although one embodiment of suitable circuitry for implementing a portion of a controllable amplification and combining circuit is shown, the teachings herein are applicable to controllable amplification and combining circuits implemented in a wide variety of ways.

The selection signals Sel_0 and Sel_1 operate to select the first pair of selection transistors 353a-353b or the second pair of selection transistors 354a-354b, thereby providing connection to a first differential output Vout_0_p, Vout_0_n or to a second differential output Vout_1_p, Vout_1_n. The selection signals Sel_0 and Sel_1 operate to control the mode of a controllable amplification and combining circuit between the first mode and the second mode, as discussed above.

The weighted resistors 371-374 are binary weighted, in this embodiment. Additionally, one or more of the gain control signals Gain_1, Gain_2, Gain_3, Gain_4 can be activated to provide a desired amount of gain to the differential input signal Vin_p, Vin_n. Although an example with four gain stages is shown, more or fewer gain stages can be included.

The DC offset compensation circuit 302 outputs a differential output signal Vout_dc_p, Vout_dc_n to provide a DC offset for compensation. The amount of DC offset is controlled by a control signal CTL, in this example.

Figure 8:
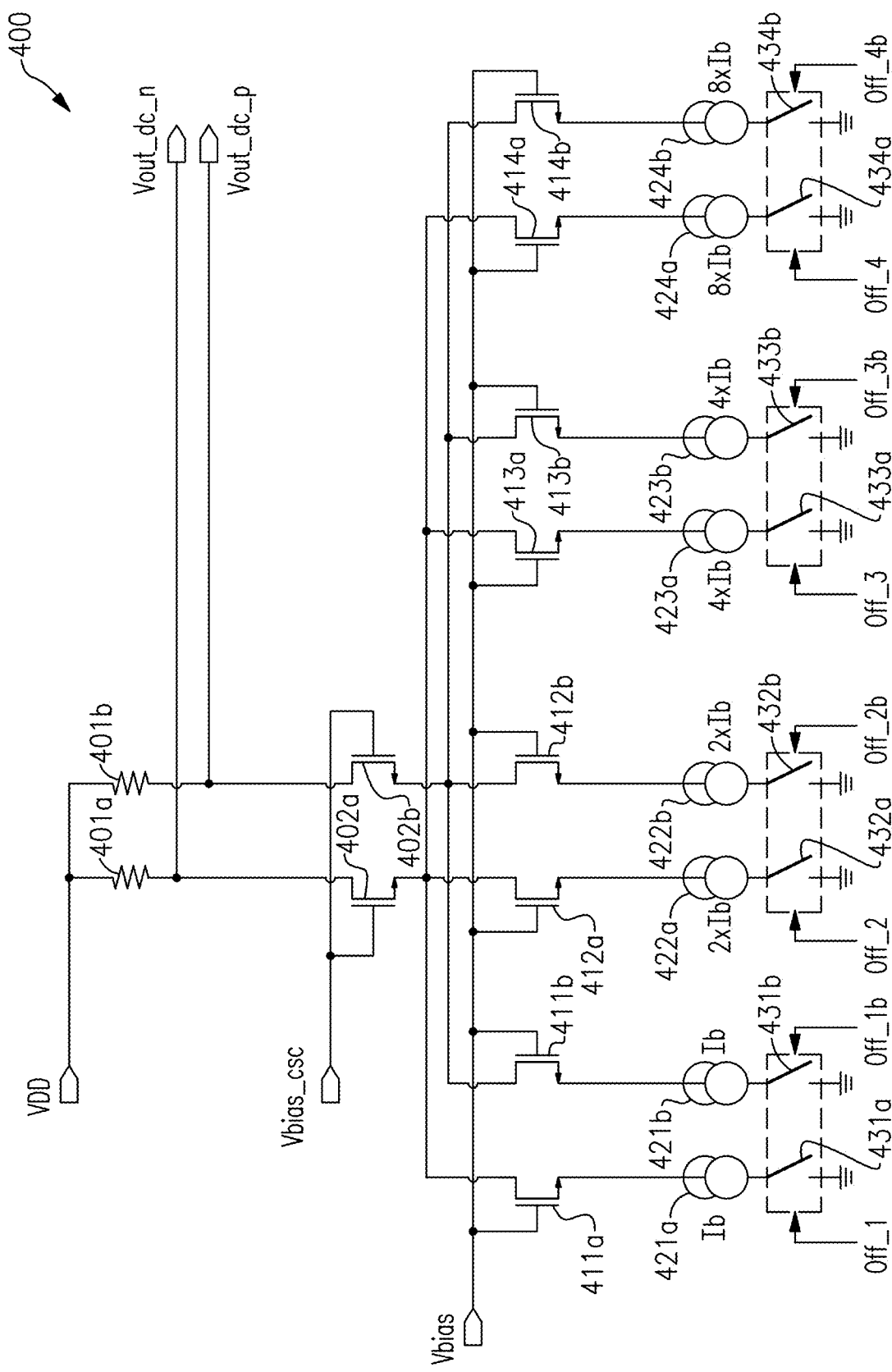
FIG. 8 is a schematic diagram of one embodiment of a DC offset compensation circuit.

FIG. 8 is a schematic diagram of one embodiment of a DC offset compensation circuit 400. The DC offset compensation circuit 400 includes a pair of load resistors 401a-401b, a pair of cascode transistors 402a-402b, a first pair of compensation control transistors 411a-411b, a second pair of compensation control transistors 412a-412b, a third pair of compensation control transistors 413a-413b, a fourth pair of compensation control transistors 414a-414b, a first pair of weighted bias current sources 421a-421b, a second pair of weighted bias current sources 422a-422b, a third pair of weighted bias current sources 423a-423b, a fourth pair of weighted bias current sources 424a-424b, a first pair of selection switches 431a-431b, a second pair of selection switches 432a-432b, a third pair of selection switches 433a-433b, and a fourth pair of selection switches 434a-434b. The circuitry 350 is powered by a supply voltage VDD and ground. As shown in FIG. 8, each pair of compensation control transistors receives a bias voltage Vbias, and the pair of cascode transistors 402a-402b receives a cascode bias voltage Vbias_csc.

The first pair of selection switches 431a-431b is controlled by a first pair of complementary control signals Off_1, Off_1b. Likewise, the second pair of selection switches 432a-432b is controlled by a second pair of complementary control signals Off_2, Off_2b. Similarly, the third pair of selection switches 433a-433b is controlled by a third pair of complementary control signals Off_3, Off_3b. Furthermore, the fourth pair of selection switches 434a-434b is controlled by a fourth pair of complementary control signals Off_4, Off_4b.

When a particular current source is activated by a particular selection switch, current from the bias current source flows through the corresponding cascode transistor 402a or 402b and load resistor 401a or 401b to control the differential output voltage Vout_dc_p, Vout_dc_n. Although an example with four pairs of weighted bias current sources is shown, other implementations are possible, such as configurations using more or fewer current sources. In this embodiment, the pairs of weighted bias current sources are binary weighted.

Figure 9A:
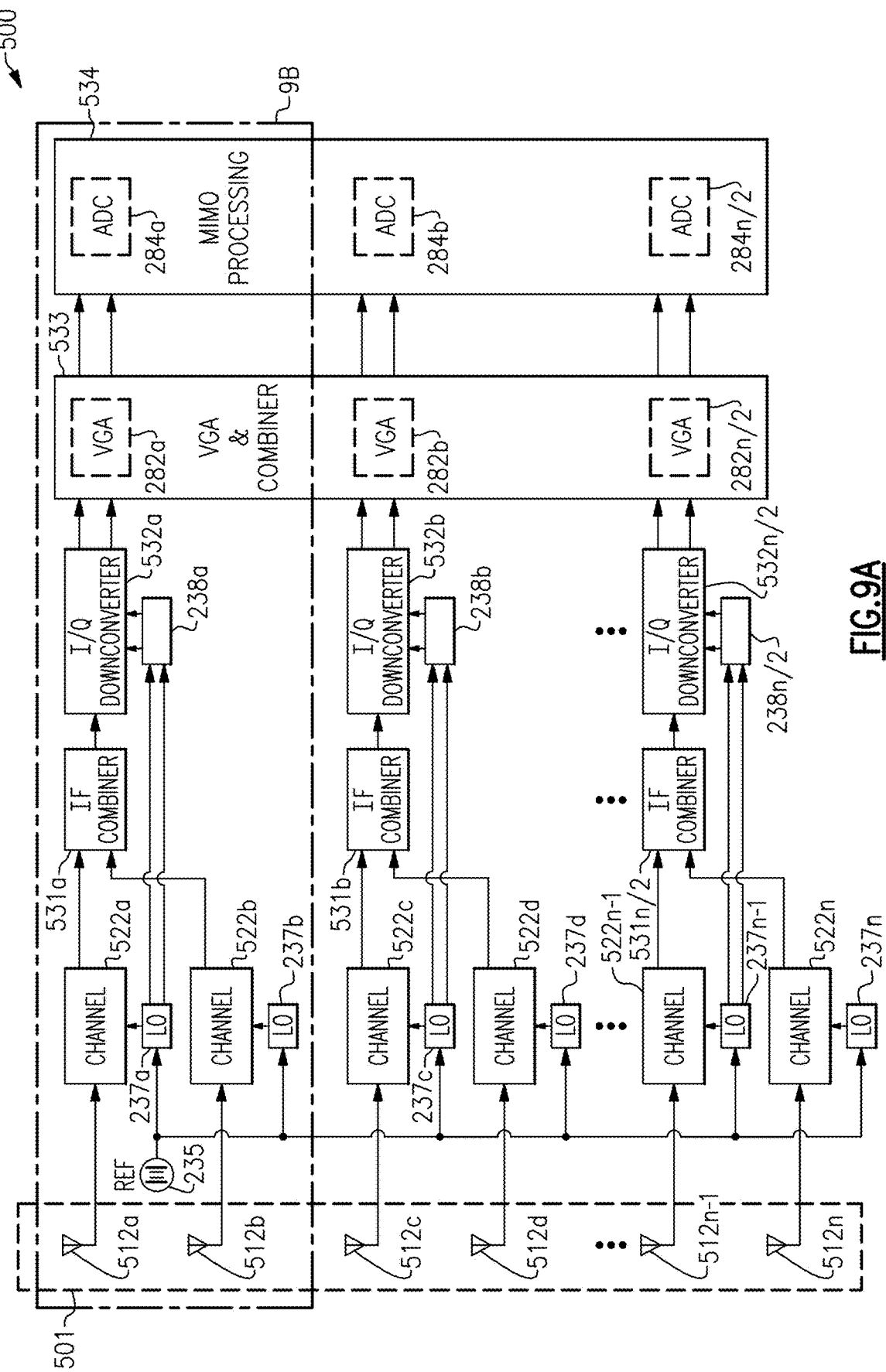
FIG. 9A is a schematic diagram of a communication system according to another embodiment.

FIG. 9A is a schematic diagram of a communication system 500 according to another embodiment. The communication system 500 includes an antenna array 501, RF circuit channels 522a, 522b, 522c, 522d, . . . 522n-1, 522n, a timing reference generator 235, LOs 237a, 237b, 237c, 237d, . . . 237n-1, 237n, I/Q dividers 238a, 238b, . . . 238n/2, IF combiners 531a, 531b, . . . 531n/2, I/Q downconverters 532a, 532b, . . . 532n/2, a VGA and combiner circuit 533, and a MIMO processing circuit 534. The antenna array 501 includes antenna elements 512a, 512b, 512c, 512d, . . . 512n-1, 512n. Additionally, the VGA and combiner circuit 233 includes VGAs 282a, 282b, . . . 282n/2. Furthermore, the MIMO processing circuit includes ADCs 284a, 284b, . . . 284n/2. In this embodiment, n is an even integer, for instance, an integer of at least 2, or more particularly, 4 or greater.

The communication system 500 of FIG. 9A is similar to the communication system 230 of FIG. 5B, except that the communication system 500 includes the RF combiners 531a, 531b, . . . 531n, which provide combining at IF for signals received from groups of antenna elements (groups of two, in this example). In certain implementations, two or more signals received from the antenna array 201 are combined at IF.

After combining at IF and subsequent downconversion, the analog baseband signals are provided to the VGA and combiner circuit 533, which can provide controllable amplification and combining as described above.

Figure 9B:
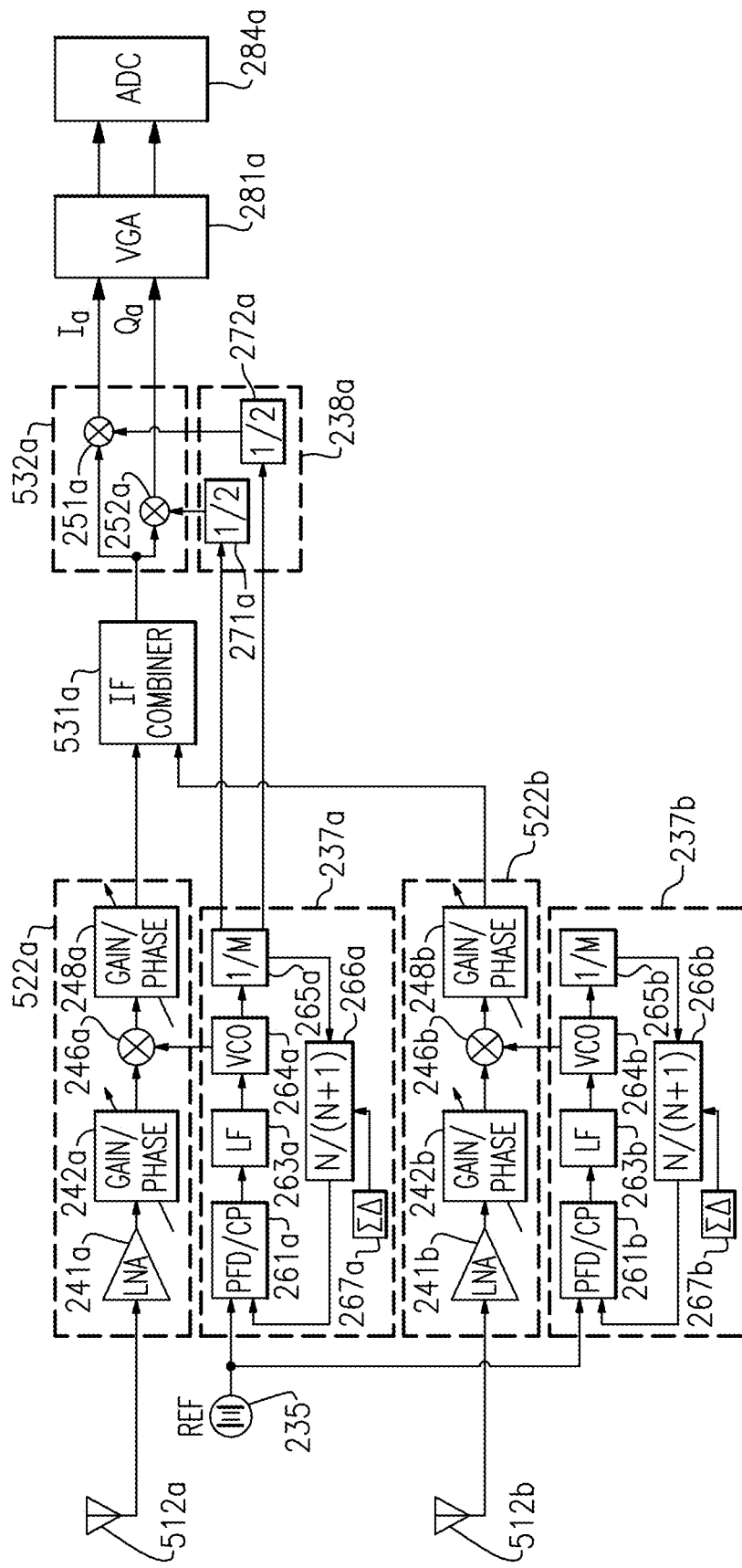
FIG. 9B is a schematic diagram of one embodiment of a portion of the communication system of FIG. 9A.

FIG. 9B is a schematic diagram of one embodiment of a portion 9B of the communication system 500 of FIG. 9A. The illustrated circuitry includes the timing reference generator 235, the first antenna element 512a, the second antenna element 512b, the first RF circuit channel 522a, the second RF circuit channel 522b, the first LO 237a, the second LO 237b, the I/F combiner 531a, the I/Q downconverter 532a, the I/Q divider 238a, the VGA 281a, and the ADC 284a.

As shown in FIG. 9B, the first RF circuit channel 522a includes the LNA 241a, the RF VGA phase shifter 242a, the RF-to-IF mixer 246a, and the IF AGC phase shifter 248a. Additionally, the second RF circuit channel 522b includes the LNA 241b, the RF VGA phase shifter 242b, the RF-to-IF mixer 246b, and the IF AGC phase shifter 248b. The I/Q downconverter 532a includes the I-path mixer 251a and the Q-path mixer 252a. The I/Q divider 238a includes the first divider 271a and the second divider 272a. The LO 237a includes the PFD/CP 261a, the loop filter 263a, the VCO 264a, the output divider 265a, the feedback divider 266a, and the ΣΔ modulator 267a. Similarly, the LO 237b includes the PFD/CP 261b, the loop filter 263b, the VCO 264b, the output divider 265b, the feedback divider 266b, and the ΣΔ modulator 267b.

Figure 10:
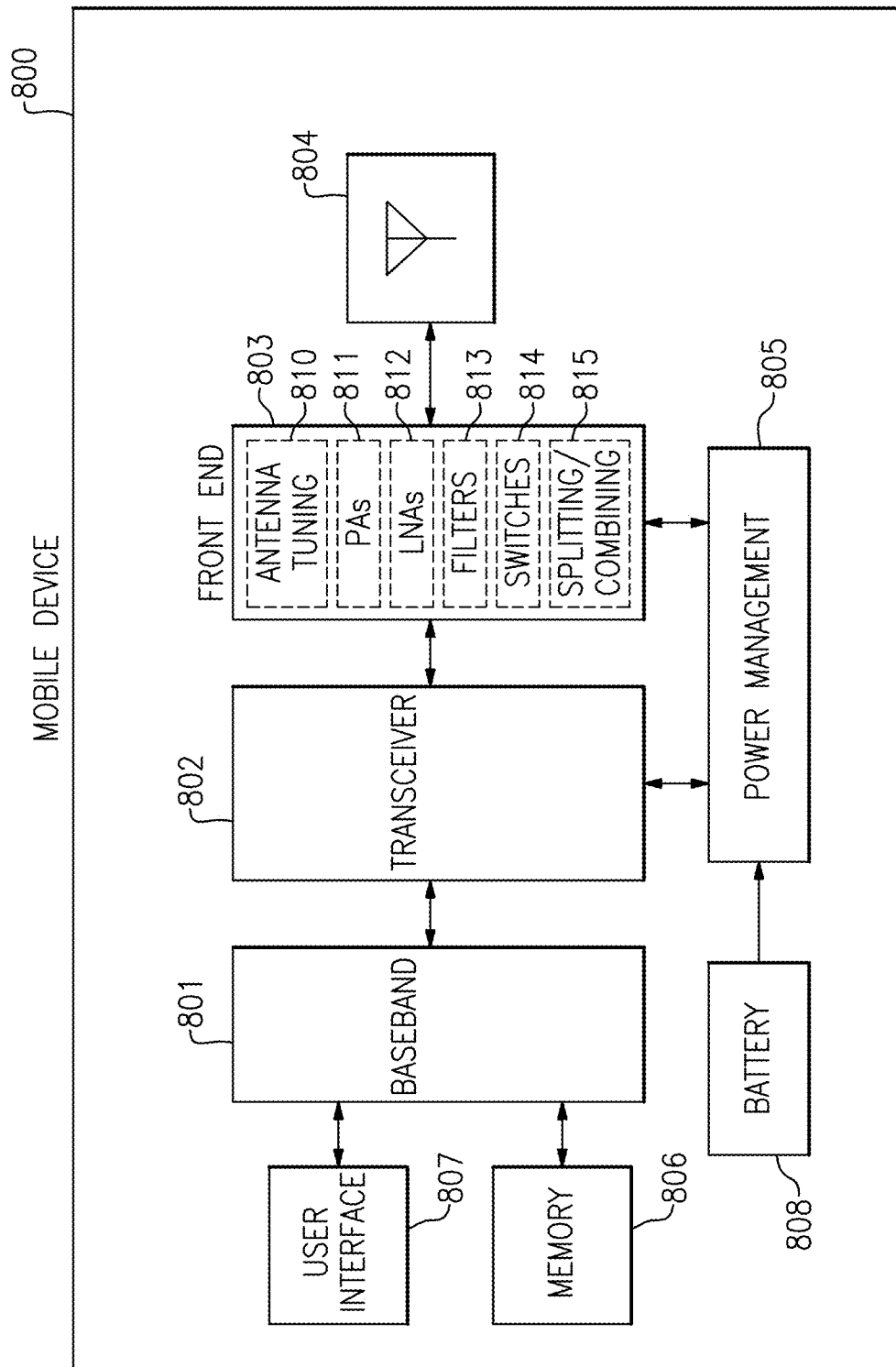
FIG. 10 is a schematic diagram of one embodiment of a mobile device.

FIG. 10 is a schematic diagram of one embodiment of a mobile device 800. The mobile device 800 includes a baseband system 801, a transceiver 802, a front end system 803, antennas 804, a power management system 805, a memory 806, a user interface 807, and a battery 808.

The mobile device 800 can be used communicate using a wide variety of communications technologies, including, but not limited to, 2G, 3G, 4G (including LTE, LTE-Advanced, and LTE-Advanced Pro), 5G NR, WLAN (for instance, WiFi), WPAN (for instance, Bluetooth and ZigBee), WMAN (for instance, WiMax), and/or GPS technologies.

The transceiver 802 generates RF signals for transmission and processes incoming RF signals received from the antennas 804. It will be understood that various functionalities associated with the transmission and receiving of RF signals can be achieved by one or more components that are collectively represented in FIG. 10 as the transceiver 802. In one example, separate components (for instance, separate circuits or dies) can be provided for handling certain types of RF signals.

The front end system 803 aids is conditioning signals transmitted to and/or received from the antennas 804. In the illustrated embodiment, the front end system 803 includes antenna tuning circuitry 810, power amplifiers (PAs) 811, low noise amplifiers (LNAs) 812, filters 813, switches 814, and signal splitting/combining circuitry 815. However, other implementations are possible.

For example, the front end system 803 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 800 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 804 can include antennas used for a wide variety of types of communications. For example, the antennas 804 can include antennas for transmitting and/or receiving signals associated with a wide variety of frequencies and communications standards.

In certain implementations, the antennas 804 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 800 can operate with beamforming in certain implementations. For example, the front end system 803 can include amplifiers having controllable gain and phase shifters having controllable phase to provide beam formation and directivity for transmission and/or reception of signals using the antennas 804. For example, in the context of signal transmission, the amplitude and phases of the transmit signals provided to the antennas 804 are controlled such that radiated signals from the antennas 804 combine using constructive and destructive interference to generate an aggregate transmit signal exhibiting beam-like qualities with more signal strength propagating in a given direction. In the context of signal reception, the amplitude and phases are controlled such that more signal energy is received when the signal is arriving to the antennas 804 from a particular direction. In certain implementations, the antennas 804 include one or more arrays of antenna elements to enhance beamforming.

The baseband system 801 is coupled to the user interface 807 to facilitate processing of various user input and output (I/O), such as voice and data. The baseband system 801 provides the transceiver 802 with digital representations of transmit signals, which the transceiver 802 processes to generate RF signals for transmission. The baseband system 801 also processes digital representations of received signals provided by the transceiver 802. As shown in FIG. 10, the baseband system 801 is coupled to the memory 806 of facilitate operation of the mobile device 800.

The memory 806 can be used for a wide variety of purposes, such as storing data and/or instructions to facilitate the operation of the mobile device 800 and/or to provide storage of user information.

The power management system 805 provides a number of power management functions of the mobile device 800. In certain implementations, the power management system 805 includes a PA supply control circuit that controls the supply voltages of the power amplifiers 811. For example, the power management system 805 can be configured to change the supply voltage(s) provided to one or more of the power amplifiers 811 to improve efficiency, such as power added efficiency (PAE).

As shown in FIG. 10, the power management system 805 receives a battery voltage from the battery 808. The battery 808 can be any suitable battery for use in the mobile device 800, including, for example, a lithium-ion battery.

Figure 11A:
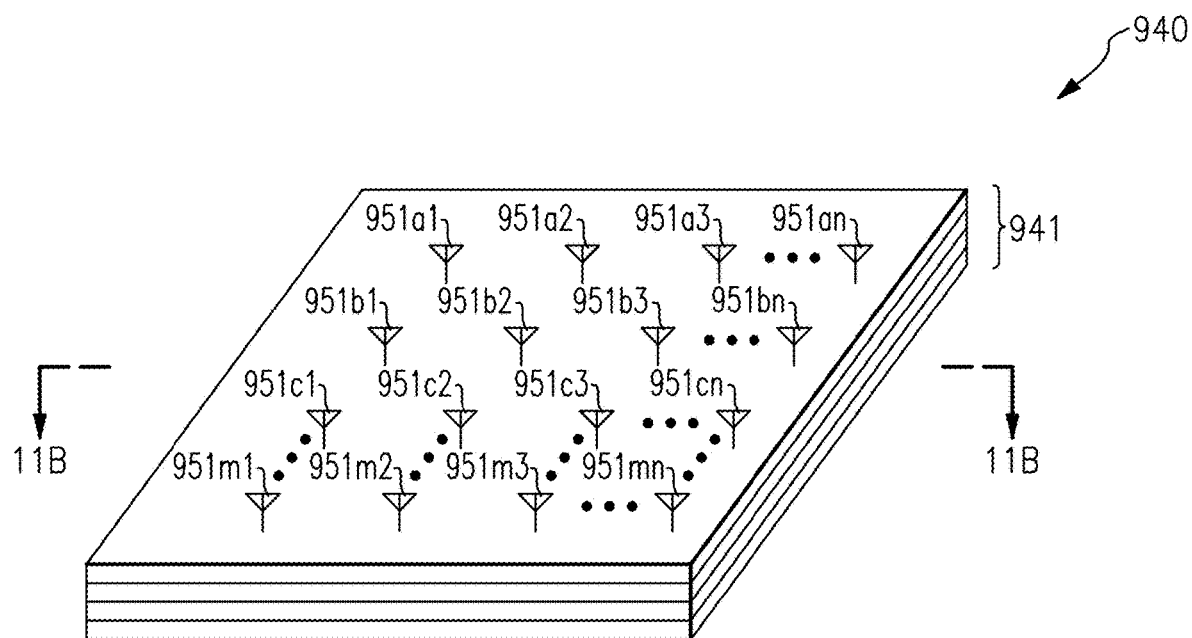
FIG. 11A is a perspective view of one embodiment of a module that operates with beamforming.
Figure 11B:
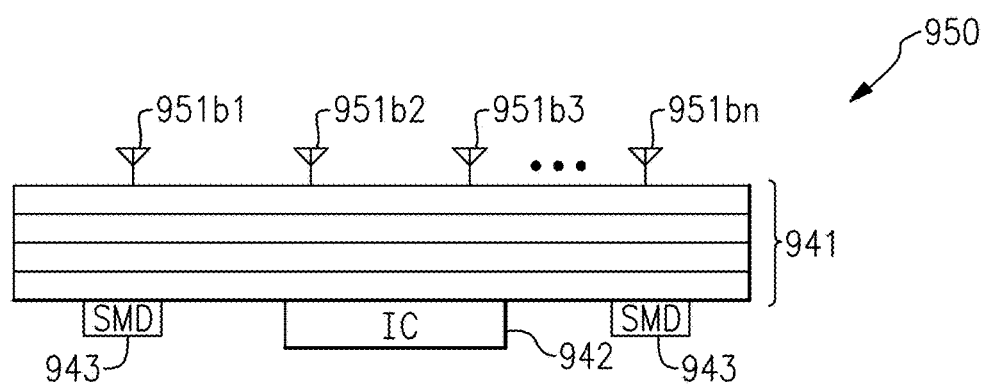
FIG. 11B is a cross-section of the module of FIG. 11A taken along the lines 11B-11B.

FIG. 11A is a perspective view of one embodiment of a module 940 that operates with beamforming. FIG. 11B is a cross-section of the module 940 of FIG. 11A taken along the lines 11B-11B.

The module 940 includes a laminated substrate or laminate 941, a semiconductor die or IC 942 (not visible in FIG. 11A), surface mount devices (SMDs) 943 (not visible in FIG. 11A), and an antenna array including antenna elements 951$a$1, 951$a$2, 951$a$3 . . . 951$an$, 951$b$1, 951$b$2, 951$b$3 . . . 951$bn$, 951$c$1, 951$c$2, 951$c$3 . . . 951$cn$, 951$m$1, 951$m$2, 951$m$3 . . . 951$mn$.

Although one embodiment of a module is shown in FIGS. 11A and 11B, the teachings herein are applicable to modules implemented in a wide variety of ways. For example, a module can include a different arrangement of and/or number of antenna elements, dies, and/or surface mount devices. Additionally, the module 940 can include additional structures and components including, but not limited to, encapsulation structures, shielding structures, and/or wirebonds.

The antenna elements antenna elements 951$a$1, 951$a$2, 951$a$3 . . . 951$an$, 951$b$1, 951$b$2, 951$b$3 . . . 951$bn$, 951$c$1, 951$c$2, 951$c$3 . . . 951$cn$, 951$m$1, 951$m$2, 951$m$3 . . . 951$mn$ are formed on a first surface of the laminate 941, and can be used to receive and/or transmit signals, based on implementation. Although a 4×4 array of antenna elements is shown, more or fewer antenna elements are possible as indicated by ellipses. Moreover, antenna elements can be arrayed in other patterns or configurations, including, for instance, arrays using non-uniform arrangements of antenna elements. Furthermore, in another embodiment, multiple antenna arrays are provided, such as separate antenna arrays for transmit and receive and/or for different communication bands.

In the illustrated embodiment, the IC 942 is on a second surface of the laminate 941 opposite the first surface. However, other implementations are possible. In one example, the IC 942 is integrated internally to the laminate 941.

In certain implementations, the IC 942 includes signal conditioning circuits associated with the antenna elements 951$a$1, 951$a$2, 951$a$3 . . . 951$an$, 951$b$1, 951$b$2, 951$b$3 . . . 951$bn$, 951$c$1, 951$c$2, 951$c$3 . . . 951$cn$, 951$m$1, 951$m$2, 951$m$3 . . . 951$mn$. In one embodiment, the IC 942 includes a serial interface, such as a mobile industry processor interface radio frequency front-end (MIPI RFFE) bus and/or inter-integrated circuit (I$^2$C) bus that receives data for controlling the signal conditioning circuits, such as the amount of phase shifting provided by phase shifters. In another embodiment, the IC 942 includes signal conditioning circuits associated with the antenna elements 951$a$1, 951$a$2, 951a3 ... 951an, 951b1, 951b2, 951b3 ... 951bn, 951c1, 951c2, 951c3 ... 951cn, 951m1, 951m2, 951m3 ... 951mn and an integrated transceiver.

The laminate 941 can include various structures including, for example, conductive layers, dielectric layers, and/or solder masks. The number of layers, layer thicknesses, and materials used to form the layers can be selected based on a wide variety of factors, and can vary with application and/or implementation. The laminate 941 can include vias for providing electrical connections to signal feeds and/or ground feeds of the antenna elements. For example, in certain implementations, vias can aid in providing electrical connections between signal conditioning circuits of the IC 942 and corresponding antenna elements.

The antenna elements 951a1, 951a2, 951a3 ... 951an, 951b1, 951b2, 951b3 ... 951bn, 951c1, 951c2, 951c3 ... 951cn, 951m1, 951m2, 951m3 ... 951mn can correspond to antenna elements implemented in a wide variety of ways. In one example, the array of antenna elements includes patch antenna element formed from a patterned conductive layer on the first side of the laminate 941, with a ground plane formed using a conductive layer on opposing side of the laminate 941 or internal to the laminate 941. Other examples of antenna elements include, but are not limited to, dipole antenna elements, ceramic resonators, stamped metal antennas, and/or laser direct structuring antennas.

The module 940 can be included a communication system, such as a mobile phone or base station. In one example, the module 940 is attached to a phone board of a mobile phone.

Applications

Some of the embodiments described above have provided examples of dynamic antenna array management in connection with wireless communications devices. However, the principles and advantages of the embodiments can be used for any other systems or apparatus that benefit from any of the circuits and systems described herein.

For example, antenna arrays can be included in various electronic devices, including, but not limited to consumer electronic products, parts of the consumer electronic products, electronic test equipment, etc. Example electronic devices include, but are not limited to, a base station, a wireless network access point, a mobile phone (for instance, a smartphone), a tablet, a television, a computer monitor, a computer, a hand-held computer, a personal digital assistant (PDA), a microwave, a refrigerator, an automobile, a stereo system, a disc player, a digital camera, a portable memory chip, a washer, a dryer, a copier, a facsimile machine, a scanner, a multi-functional peripheral device, a wrist watch, a clock, etc. Further, the electronic devices can include unfinished products.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "may," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A radio frequency system comprising:
   two or more frequency downconverters configured to output two or more analog baseband signals in response to receiving a plurality of radio frequency signals from an antenna array;
   a controllable amplification and combining circuit configured to generate two or more amplified analog baseband signals based on amplifying each of the two or more analog baseband signals with a separately controllable gain, to combine the two or more amplified analog baseband signals to generate a combined analog baseband signal in a first mode, and to output the two or more amplified analog baseband signals in a second mode, the radio frequency system operating with beamforming in the first mode and with diversity communications in the second mode; and a data conversion and signal processing circuit configured to receive the combined analog baseband signal.

2. The radio frequency system of claim 1 wherein the controllable amplification and combining circuit includes two or more controllable gain input amplifiers configured to amplify the two or more analog baseband signals to generate the two or more amplified analog baseband signals.

3. The radio frequency system of claim 2 wherein the controllable amplification and combining circuit further includes two or more DC offset compensation circuits each configured to provide a separately controllable DC offset correction to a corresponding one of the two or more controllable gain input amplifiers.

4. The radio frequency system of claim 1 wherein the data conversion and signal processing circuit includes two or more analog-to-digital converters each configured to receive a corresponding one of the two or more amplified analog baseband signals.

5. The radio frequency system of claim 1 further comprising two or more local oscillators configured to control downconversion of the two or more frequency downconverters.

6. The radio frequency system of claim 5 wherein the two or more local oscillators each include a phase-locked-loop configured to receive a common timing reference signal.

7. The radio frequency system of claim 1 further comprising the antenna array, the antenna array including a plurality of antenna elements and configured to generate the plurality of radio frequency signals in response to receiving a radio wave.

8. The radio frequency system of claim 7 further comprising phase shifting circuitry configured to perform phase shifting at an intermediate frequency that is less than a frequency of the radio wave.

9. A method of radio frequency communication, the method comprising:

receiving a radio wave using a plurality of antenna elements of an antenna array;

generating two or more analog baseband signals using a plurality of radio frequency circuit channels each coupled to a corresponding one of the plurality of antenna elements;

amplifying each of the two or more analog baseband signals with a separately controllable gain using a controllable amplification and combining circuit;

combining the two or more amplified analog baseband signals to generate a combined analog baseband signal using the controllable amplification and combining circuit in a first mode of the controllable amplification and combining circuit;

outputting the two or more amplified analog baseband signals in a second mode of the controllable amplification and combining circuit; and forming a receive beam in the first mode and operating with diversity communications in the second mode.

10. The method of claim 9 further comprising compensating for a DC offset of each of the two or more amplified analog baseband signals.

11. The method of claim 9 further comprising converting the combined analog baseband signal to a digital signal.

12. The method of claim 9 further comprising performing phase shifting in each of the radio frequency circuit channels at an intermediate frequency that is less than a frequency of the radio wave.

13. The method of claim 9 further comprising generating a plurality of clock signals using a plurality of local oscillators operating with a common timing reference signal, and providing each of the plurality of clock signals to a corresponding one of the plurality of radio frequency circuit channels.

14. The method of claim 9 generating a first intermediate frequency signal using a first radio frequency circuit channel of the plurality of radio frequency circuit channels, generating a second intermediate frequency signal using a second radio frequency circuit channel of the plurality of radio frequency circuit channels, and combining the first intermediate frequency signal and the second intermediate frequency signal.

15. A communication system comprising:

an antenna array including a plurality of antenna elements;

a plurality of radio frequency circuit channels each coupled to a corresponding one of the plurality of antenna elements, the plurality of radio frequency circuit channels operable to generate two or more analog baseband signals in response to the antenna array receiving a radio wave; and a controllable amplification and combining circuit configured to generate two or more amplified analog baseband signals based on amplifying each of the two or more analog baseband signals with a separately controllable gain, to combine the two or more amplified analog baseband signals to generate a combined analog baseband signal in a first mode, and to output the two or more amplified analog baseband signals in a second mode, the communication system operating with beamforming in the first mode and with diversity communications in the second mode.

16. The communication system of claim 15 wherein the controllable amplification and combining circuit includes two or more controllable gain input amplifiers configured to amplify the two or more analog baseband signals to generate the two or more amplified analog baseband signals.

17. The radio frequency system of claim 16 wherein the controllable amplification and combining circuit further includes two or more DC offset compensation circuits each configured to provide a separately controllable DC offset correction to a corresponding one of the two or more controllable gain input amplifiers.

18. The communication system of claim 15 wherein each of the plurality of radio frequency circuit channels further comprises a controllable phase shifter configured to perform phase shifting at an intermediate frequency that is less than a frequency of the radio wave.

19. The communication system of claim 15 further comprising a data conversion and signal processing circuit configured to receive the combined analog baseband signal and including two or more analog-to-digital converters each configured to receive a corresponding one of the two or more amplified analog baseband signals.

20. The communication system of claim 15 further including a plurality of local oscillators each configured to provide at least one clock signal to a corresponding one of the plurality of radio frequency circuit channels.

* * * * *